(12) United States Patent
Fujisawa et al.

(10) Patent No.: US 6,853,605 B2
(45) Date of Patent: Feb. 8, 2005

(54) ELECTRONIC TIMEPIECE WITH A CONTACTLESS DATA COMMUNICATION FUNCTION, AND A CONTACTLESS DATA COMMUNICATION SYSTEM

(75) Inventors: Teruhiko Fujisawa, Shiojiri (JP); Akira Washizawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 165 days.

(21) Appl. No.: 10/233,910

(22) Filed: Sep. 3, 2002

(65) Prior Publication Data

US 2003/0117900 A1 Jun. 26, 2003

(30) Foreign Application Priority Data

Sep. 7, 2001 (JP) .......................... 2001-272346
Jan. 28, 2002 (JP) .......................... 2002-019173

(51) Int. Cl.[7] .................. G04B 47/00; G04B 37/00; G06K 19/06
(52) U.S. Cl. .................. 368/10; 368/281; 235/487; 343/718; 343/720; 455/90.3; 455/341; 455/347
(58) Field of Search .................. 368/10, 278, 281, 368/294; 235/487, 492; 343/718, 720; 455/90.3, 341, 347

(56) References Cited

U.S. PATENT DOCUMENTS 5,627,552 A * 5/1997 Farrar et al. ............. 343/718
5,768,217 A * 6/1998 Sonoda et al. ............ 368/10
6,278,873 B1 * 8/2001 Itakura et al. ............ 455/351
6,484,947 B1 * 11/2002 Miyata ...................... 235/492
2002/0071346 A1 6/2002 Paratte et al.

FOREIGN PATENT DOCUMENTS

| JP | 54-124571 | 8/1979 |
| JP | 59-37584 | 3/1984 |
| JP | 9-311920 | 12/1997 |
| JP | 3064358 | 9/1999 |
| JP | 2002-6061 | 1/2002 |
| JP | 2002-189085 | 7/2002 |
| JP | 2002-250783 | 9/2002 |
| JP | 2002-277569 | 9/2002 |

* cited by examiner

Primary Examiner—Vit W. Miska
(74) Attorney, Agent, or Firm—Rosalio Haro

(57) ABSTRACT

An electronic watch (100) has a contactless data communication function. The case (101) of the electronic watch is constructed from metal or other conductive material, and is formed in an annular shape with a dial-side opening (101A) and a back-side opening (101B). A gap (101G) is disposed on one part of the case (101) in the circumferential direction as an insulation part, and an insulation material (109) is located and fixed inside this gap (101G). Because the occurrence of an eddy current can thus be prevented, a drop in communication function can be suppressed even though an annular conductive member is used in the case or other structural parts. Furthermore, because the strength of the case can be improved and the seal or water resistance can be easily assured, the reliability of the electronic watch can be increased.

16 Claims, 20 Drawing Sheets

ELECTRONIC TIMEPIECE WITH A CONTACTLESS DATA COMMUNICATION FUNCTION, AND A CONTACTLESS DATA COMMUNICATION SYSTEM

TECHNICAL FIELD

The present invention relates to an electronic timepiece having a contactless data communication function and to a contactless data communication system.

RELATED ART

Magnetic cards are widely used today for many different applications, including telephone cards, various kinds of credit cards, frequent shopper cards issued by retail stores, and prepaid toll cards. That such cards can be easily forged, however, is a problem for society. IC cards are therefore starting to be used to prevent forgery, maintain confidential personal information, and for increased storage capacity.

However, even IC cards must contact a card reader/writer in order to exchange data, and during a transaction, that is, when reading/writing data to an IC card, the IC card must be handed to another person or passed through the reader/writer, and IC cards can thus not be considered completely safe with respect to forgery and maintaining confidentiality.

The more recently introduced contactless IC cards, on the other hand, can contactlessly communicate data with the reader/writer and thus offer improved safety and convenience when reading and writing the card. However, because they are cards, there is the danger of accidental loss since they must be removed from a pocket when used, and thus they also have drawbacks.

For these reasons products having this contactless IC card function built in to the kind of wristwatch that is normally worn by the user have also been recently developed. This wristwatch is a wristwatch with the communication structure built in to a contactless IC card, that is, an antenna and a transceiver means for contactless data communication with an external device via the antenna, contained in the watch case.

However, the wristwatch case must be made from an insulating material because the antenna is disposed inside the case and the wristwatch incorporates the functionality of an internal contactless IC card. Because metal materials and other such conductive materials that are frequently used as the case material for conventional wristwatches cannot be used, great limitations are imposed on the exterior design of a watch having this contactless IC card functionality, and a particular problem is that a cheap image lacking in a sense of high quality cannot be eliminated.

Furthermore, even if an insulating material is used for the case, if a conductive member is affixed on the inside and outside of the case, an eddy current (loop current) can be produced in the conductive member by externally emitted radio waves or radio waves emitted by the wristwatch itself, and energy loss from this eddy current leads to degraded communication characteristics (such as a drop in the communication distance). As a result, a further problem is that an annular electrically conductive member cannot be used for the rotating bezel or decorative edge affixed externally to the case, or the dial or spacer provided inside the case.

The present invention is therefore directed to solving the above problems, and an object of the invention is to provide an electronic timepiece having a contactless data communication function whereby a drop in communication capabilities can be suppressed without degrading the performance required for a normal watch even when an annular electrically conductive member is used for the case or other parts. A further object is to improve the reliability of an electronic timepiece having a contactless data communication function by improving case strength or improving the water resistance or seal of the case.

SUMMARY OF THE INVENTION

To achieve the above object an electronic timepiece with a contactless data communication function according to the present invention is characterized by having a contactless communication unit for contactless data communication with an external transceiver device, a conductive member formed effectively in a ring, a time measuring means, and a time information display unit, the contactless communication unit having an antenna for producing a magnetic field in the circumferential axis direction of the conductive member and a transceiver means for contactless data communication via the antenna, the conductive member being part of a case housing the time measuring means and having an electrical insulation part in at least one part in the circumferential direction, and the insulation part having a gap electrically separating the conductive member in the circumferential direction thereof and a non-conductive member disposed inside this gap.

Because according to this invention there is an insulation part in at least one part in the circumferential direction of the conductive member, current flow in the circumferential direction of the conductive member can be prevented by the presence of this insulation part. Because it is therefore possible to prevent an eddy current occurring along the ring shape of the conductive member due to a magnetic field fluctuating in the direction of the circumferential axis of the conductive member when radio waves are received, the effect on contactless data communication can be reduced. Particularly because a contactless data communication function having a typical boarding pass function, for example has a limited communication range in order to reduce its effect on the surroundings, and because such communication uses extremely weak radio waves, the above-noted eddy current prevention effect is extremely great.

Furthermore, because a gap providing an electrical insulation effect is not simply disposed in part in the circumferential direction of the conductive member and a non-conductive member is placed in this gap in the conductive member in the present invention, the rigidity of this annular shape can be assured, the shape can be maintained, case strength can be increased and the water resistance and seal of the case can be achieved as needed. For example, if a gap is simply disposed in part in the circumferential direction of the conductive member, case strength is lowered and it is difficult to assure the water resistance and seal of the case because of this gap. Furthermore, even if the gap is bonded with adhesive, for example, the adhesive surface could separate, and it is difficult to sufficiently assure the case strength and the water resistance or seal of the case. By disposing a non-conductive member inside this gap in the present invention, the rigidity of the conductive member can be increased according to the hardness, elastic modulus, and other mechanical characteristics of the non-conductive member, and water resistance and seal can be easily assured by optimizing the shape of the non-conductive member or disposing packing or the seal member between the conductive member and the non-conductive member. The reliability of an electronic timepiece having a contactless data communication function can therefore be improved.

Furthermore, because freedom in the dimensions of the conductive member is achieved by disposing a non-conductive member in the gap, even greater freedom can be achieved in designing the case construction, enabling, for example, an external operating member to be provided passing through the non-conductive member.

It should be noted that the above "formed effectively in a ring" means that, assuming the above-noted gap and the non-conductive member disposed therein are not present, it is formed in a shape enabling formation of a closed conduction path whereby an eddy current can be produced.

In the present invention the non-conductive member preferably engages the conductive member in the circumferential axis direction or circumferential radius direction of the conductive member. As a result of the non-conductive member disposed inside the gap engaging the conductive member in the circumferential axis direction or circumferential radius direction, the non-conductive member can be easily positioned when mounted to the conductive member and because the conductive member is supported by the non-conductive member in the circumferential axis direction or circumferential radius direction of the conductive member, the strength of the conductive member can be further increased.

Further preferably, there is an insulating inside case for housing the contactless communication unit, and the conductive member is mounted to an outside surface of the inside case. Because the contactless communication unit is placed inside an insulating inside case, electrical shorts and communication problems can be prevented, and because the conductive member is attached to the outside of the inside case, exterior design freedom can be increased. It should be noted that attaching the conductive member so that it covers the entire inside case is preferable with respect to achieving a high quality appearance.

Yet further preferably, the conductive member is disposed around the time information display unit. Examples of this conductive member include a bezel (rotating bezel), decorative bead, and a glass edge.

It is particularly preferable that the non-conductive member has an annular frame part configured so as to overlap the conductive member effectively formed in a ring and an integrally configured insulating fitting part protruding from this annular frame part. When thus comprised the presence of the annular frame part overlapping the conductive member makes it possible for the insulating fitting part to be disposed in the gap in the conductive member with high installation strength. Furthermore, if the conductive member is the case, even higher water resistance, seal, and shock resistance can be achieved by configuring the annular frame part to overlap the inside of the case (that is, so that another case made from a non-conductive member is also present on the inside of the case).

The antenna is preferably a loop antenna. In this case the direction of the circumferential axis of the conductive member and the direction of the loop axis of the loop antenna are preferably substantially aligned. Because this makes it easier for electromagnetic waves (particularly the variable electromagnetic field) to propagate inside the loop of the loop antenna, sensitivity and the communication range can be increased. Furthermore, because the conductive member acts as a shield for the loop antenna, it functions as a shielded loop antenna. Moreover, if a loop antenna is used a smaller electronic timepiece can be achieved in the frequency band in which the present invention is used when compared with a bar antenna or other antenna with comparable performance.

The conductive member of the present invention may be the case for housing the contactless communication unit. Because this enables parts other than the insulation part of the case to be made using a conductive material, there is greater freedom in the exterior design and a sense of high quality can be achieved. Furthermore, because metal materials can be used, the strength of the case can be improved.

In the present invention the case is preferably substantially annular, and the time information display unit is located on one side of the axial direction of the case with at least part formed from an insulator. By forming at least part of the time information display unit using an insulator, electromagnetic waves can travel through the substantially ring-shaped opening in the case and contactless data communication is possible. In this case the entire time information display unit is preferably made from an insulator.

Further preferably the present invention also has a closing member of which at least part is an insulator on the other side of the case axis (that is, the opposite side from the time information display unit). By forming at least part of this closing member from an insulator, communication sensitivity and the communication range can be increased. It is particularly preferable to form at least the part of the closing member except at least the part overlapping the ring shape of the case, that is, the part overlapping the case opening, from an insulator. An example of this closing member is the back cover.

Further preferably the closing member has an annular conductive cover frame part open in the axial direction, and an insulating cover part mounted so as to close the opening of the cover frame part. Because a metal or other conductive material can be used for the cover frame part when thus comprised, the strength of the closing member can be increased, exterior (particularly the sides) design freedom is improved, and a high quality appearance can be achieved.

In this case an insulation part for assuring electrical insulation in the circumferential direction is preferably disposed to at least part of the cover frame part in the direction encircling the perimeter of the opening. Because eddy current occurring in the cover frame part can be reduced by also providing an insulation part to the cover frame part, the effects on contactless data communication can be further reduced.

Internal memory for recording or updating content based on communication results from the transceiver means is preferably provided in this electronic timepiece. This makes it possible to easily construct various kinds of payment systems.

A further electronic timepiece with a contactless data communication function according to the present invention is characterized by having a contactless communication unit for contactless data communication with an external transceiver device, a conductive member formed effectively in a ring, a time measuring means, and a time information display unit, the contactless communication unit having an antenna for producing a magnetic field in the circumferential axis direction of the conductive member and a transceiver means for contactless data communication via the antenna, and an insulated case for storing the contactless data communication unit and time measuring means, wherein the conductive member is mounted so as to cover the insulated case and has in at least one part in the circumferential direction an insulation part with a gap for electrically separating the conductive member in the circumferential direction.

By providing an insulation part with a gap in the conductive member, the occurrence of an eddy current in the conductive member can be prevented and a drop in the transmission strength or reception strength of the contactless communication means can be suppressed. Furthermore, exterior design freedom can be assured by means of the conductive member mounted so as to cover the insulated case. Furthermore, the reliability of the electronic timepiece can be increased because case strength or the water resistance or seal of the case can be easily assured by constructing an insulated case.

An electronic timepiece with in accord with the present invention includes a contactless data communication function characterized by the conductive member mounted so as to cover the insulated case and having in at least one part in the circumferential direction thereof an insulation part comprising a gap for electrically separating the conductive member in the circumferential direction. Moreover, a contactless data communication system according to the present invention is characterized by having any of the above-described electronic timepieces with a contactless data communication function, and an external transceiver device for contactless data communication with the electronic timepiece.

With the invention thus comprised contactless data communication with an external transceiver device is possible with an electronic timepiece having a case constructed with a metal or other annular conductive member or a conductive material in at least part.

The electronic timepiece further preferably has a display means for displaying the communication status, communication content, or communication result, for example, of the contactless data communication. This display means is preferably configured so that it can present the above-noted time information display or communication status display, for example.

DESCRIPTION OF THE PREFERRED EMBODIMENTS

Preferred embodiments of an electronic timepiece having a contactless data communication function according to the present invention is described next with reference to the accompanying figures. An exemplary electronic timepiece according to the present invention is described below using by way of example specific configurations of an electronic wristwatch having a contactless data communication function according to the present invention. The present invention shall not, however, be limited to a wristwatch, and can be applied to a pocket watch or other type of electronic watch or timepiece.

[First Embodiment]

Figure 1:
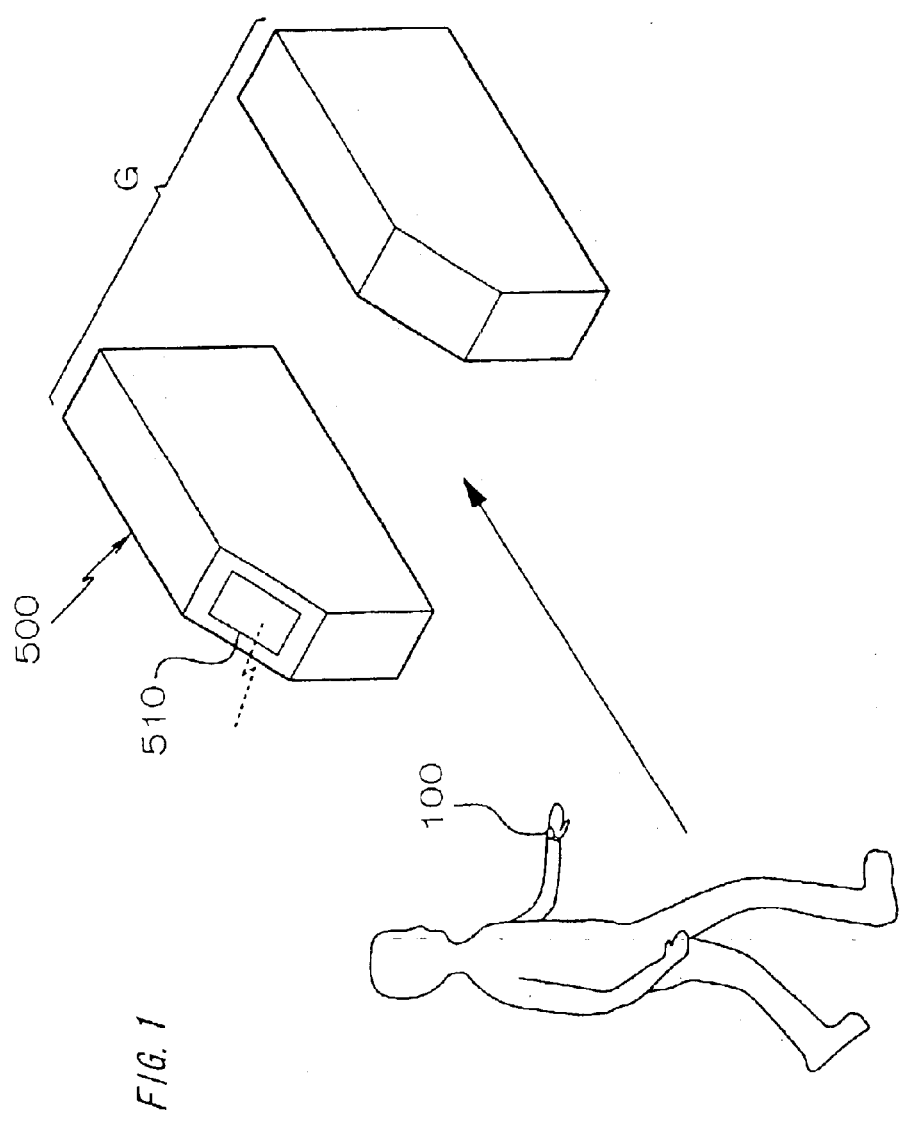
FIG. 1 is a schematic diagram showing how a communication system having an electronic watch with a contactless data communication function according to a preferred embodiment of the present invention is used.

FIG. 1 is an oblique view showing the overall configuration of a contactless data communication system for an electronic watch 100 according to a preferred embodiment of the invention. This contactless data communication system has an electronic watch 100 and an external transceiver 510 capable of contactless data communication with this electronic watch 100. In the example shown here the external transceiver 510 is built into a ticket machine 500 located where one must pass (such as a gate) in order to board a train or lift, for example.

Contactless data communication between this electronic watch 100 and external transceiver 510 is generally low power RF communication using a 13.56 [MHz] or 125 [kHz] carrier wave (carrier signal) and limiting transmission output from both devices to a low level. Therefore, because the communication range is a range of several centimeters from the external transceiver 510, the user must pass the electronic watch 100 near the antenna of the external transceiver 510 before passing the gate G to enable two-way communication.

(Configuration of the External Transceiver)

Figure 2:
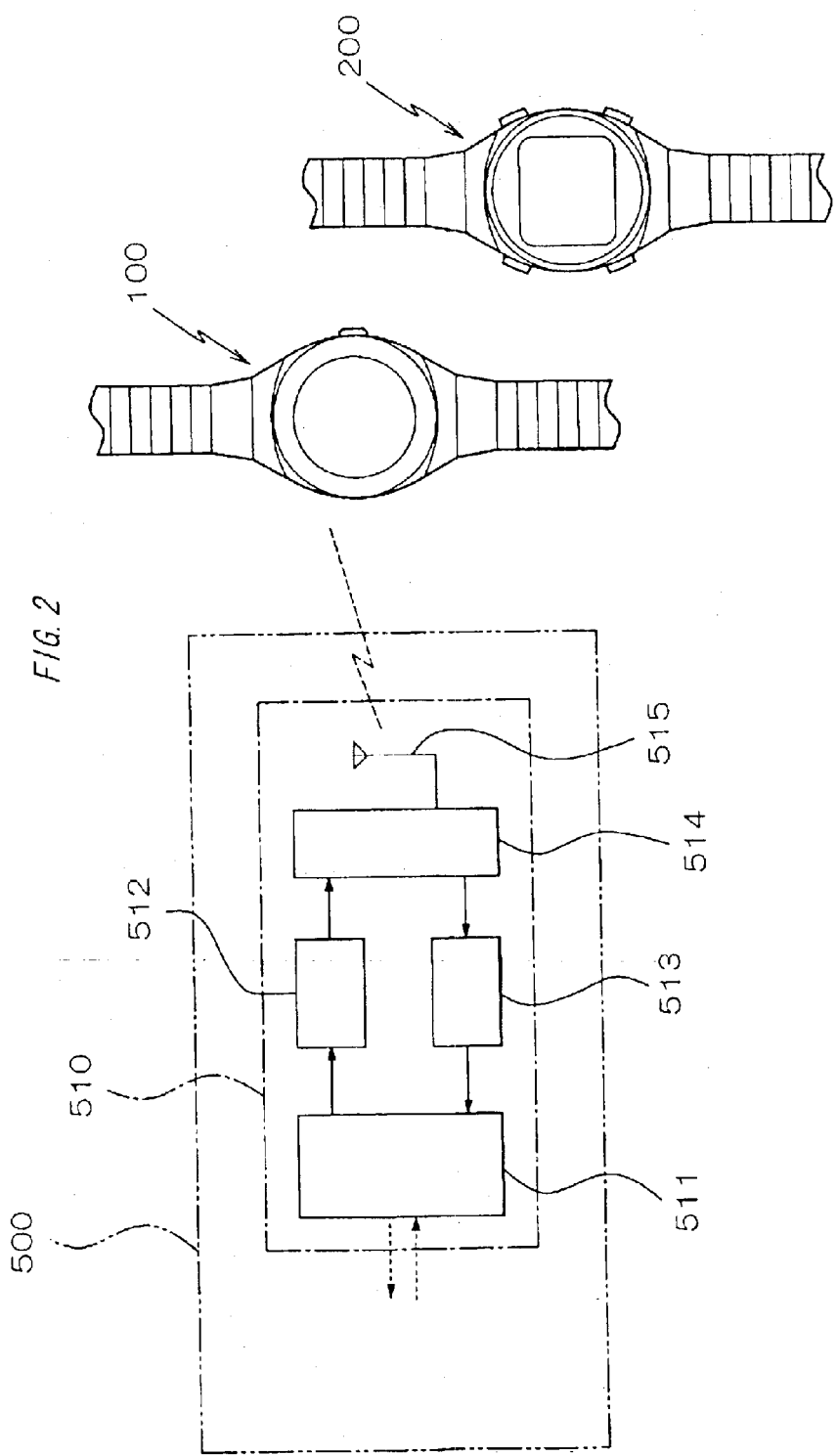
FIG. 2 is a block diagram showing the basic configuration of an external transceiver device in the communication system.

FIG. 2 is a block diagram showing the configuration of the external transceiver 510 assembled into the ticket machine 500. In this external transceiver 510 a control device 511 provides overall control of the external transceiver 510. A transmission circuit 512 generates and outputs a transmission control signal as controlled by control device 511. Receiver circuit 513 receives a reception signal captured by antenna 515 through high frequency circuit 514, demodulates the received data from this reception signal, and outputs to control device 511. Based on the transmission control signal the high frequency circuit 514 generates and sends a transmission signal via antenna 515 to electronic watch 100, and outputs reception signals received from the electronic watch 100 by antenna 515 to receiver circuit 513.

It should be noted that electronic watch 200 according to a second embodiment of the invention is shown in FIG. 2 together with electronic watch 100, and this electronic watch 200 is further described below.

(Configuration of the Contactless Communication Unit)

Figure 3:
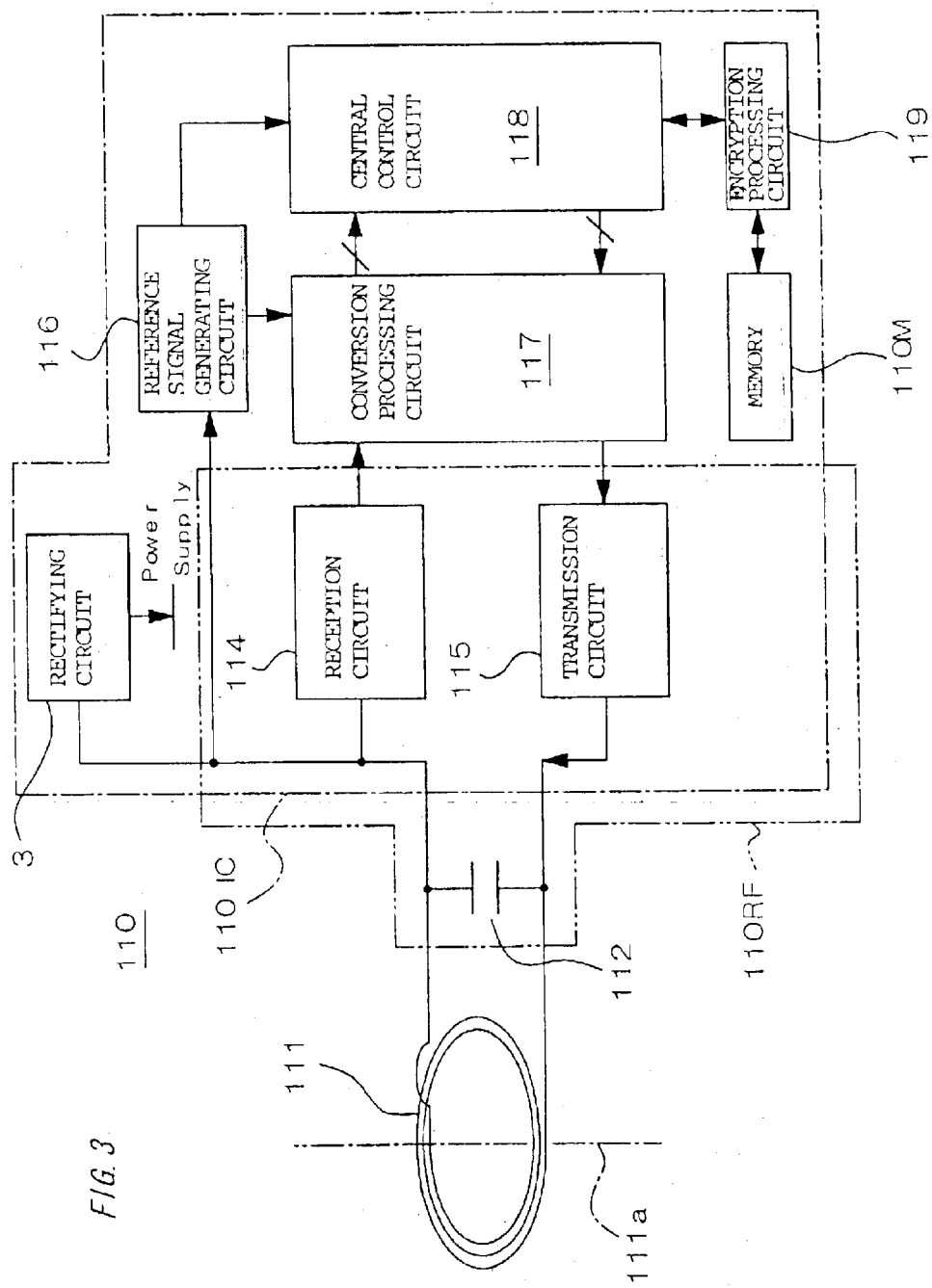
FIG. 3 is a block diagram showing the basic configuration of the contactless data communication unit of the electronic watch.

FIG. 3 is a block diagram showing the configuration of the contactless communication unit 110 having the contactless data communication function of the electronic watch 100. The contactless communication unit 110 of this electronic watch 100 has an antenna 111 and a transceiver means 110RF for communicating by way of this antenna 111. The antenna 111 is formed as a circumferential loop with loop axis 111a oriented in a specific direction. This contactless communication unit 110 can be configured using, for example, a contactless IC card standard such as ISO 14443.

The transceiver means 110RF has a tuning capacitor 112 connected to both ends of the antenna 111, and part of an integrated circuit (IC) or other communication module 110IC (transceiver circuit part).

The communication module 110IC may include: a rectifying circuit 113 connected to the antenna 111; a reception circuit 114 connected to the antenna 111 for demodulating the reception signal received by the antenna 111 and outputting the received data; a transmission circuit 115 connected to the antenna 111 for modulating the transmission data to generate and output a transmission signal to the antenna 111; a reference signal generating circuit 116 for generating a specific reference signal based on a clock signal output from an oscillation circuit, for example; a conversion processing circuit 117 for receiving the reference signal sent from the reference signal generating circuit 116, for extracting the received data content from the data stream of the received data, for receiving the transmission data content, and for producing the transmission data; a central control circuit 118 for receiving received data content from conversion processing circuit 117 and for outputting transmission data content to the conversion processing circuit 117; an encryption processing circuit 119 for encrypting transmission data and decrypting received data under the control of the central control circuit 118; and a memory 110M such as nonvolatile memory for recording an ID number and data content.

The rectifying circuit 113 is configured to extract power from the carrier wave (carrier signal) received at antenna 111, and pass the power to the other circuits over a power line, not shown in the figures. It will be noted that a configuration in which power is supplied from a battery inside the device, for example, rather than a power supply design supplying power thus generated from the received signal, could be used. Furthermore, memory 110M is preferably EEPROM, flash memory, or other rewritable memory type. Yet further, a memory card or other type of removable media can be used in place of fixed memory inside the electronic watch or in addition to such fixed memory. Yet further, the encryption processing circuit 119 has an encryption processing function such as DES (Data Encryption Standard) or RSA (encryption algorithm developed by R. L. Rivest, A. Shamir, and L. Adleman).

(Configuration of the Time Information Display Processing Function Part)

Figure 4:
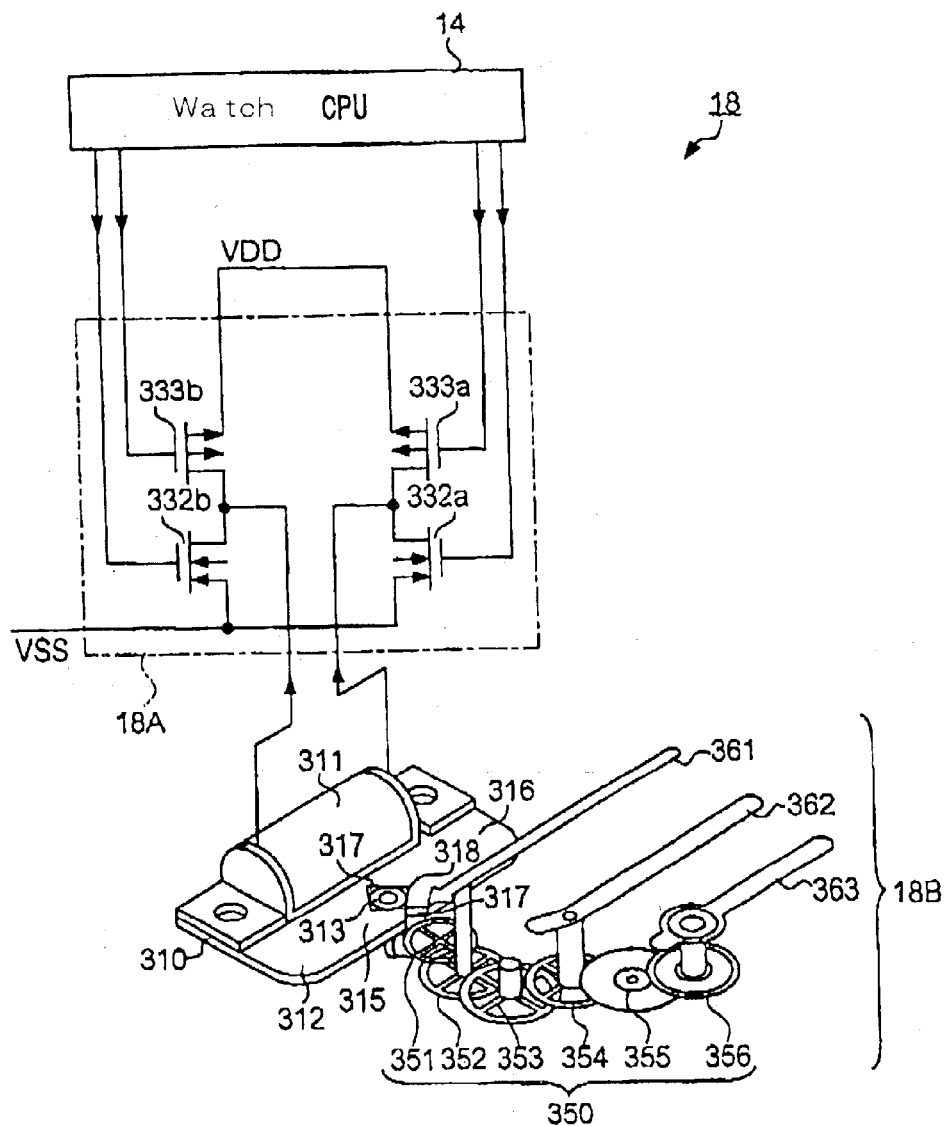
FIG. 4 is a schematic drawing showing the basic configuration of the time information display processor of the electronic watch.

FIG. 4 is a basic block diagram showing a structure (the time information display processor including a time measuring means and time information display part) for achieving the main function of the electronic watch 100. The electronic watch 100 can comprise only a contactless data communication function such as described above, but in this preferred embodiment of the invention also has the time information display function of a typical electronic watch. The configuration achieving this function includes a watch CPU 14 and hands driving unit 18.

The watch CPU 14 provides overall control of the clock function (time information display function), such as drive control over the hands or other time information display means, display format according to operation of the stem or other external operating means described further below, and internal time control.

The hands driving unit 18 includes drive circuit 18A and drive mechanism 18B. The drive mechanism 18B has a stepping motor 310 consisting of a drive coil 311 for producing magnetic force by means of the drive pulses supplied from drive circuit 18A, a stator 312 excited by this drive coil 311, and a rotor 313 that turns as a result of the magnetic field excited inside the stator 312. A magnetic saturation part 317 is disposed to the stator 312 to produce magnetic poles that differ according to the magnetic force produced by the drive coil 311 in opposing parts 315, 316 around rotor 313. An internal switch 318 is disposed at appropriate positions to the inside circumference of the stator 312 in order to regulate the direction of rotor 313 rotation. When the stator 312 is excited by the drive coil 311 in this configuration, cogging torque is produced in the rotor 313 and the rotor 313 stops at an appropriate position. Rotation of the rotor 313 of stepping motor 310 is transferred to the hands by a gear train 350 consisting of fifth wheel 351 engaging the rotor 313, fourth wheel 352, third wheel 353, second wheel 354, day wheel 355, and center wheel 356.

The second hand 361 is connected to the shaft of the fourth wheel 352, the minute hand 362 is connected to the second wheel 354, and the hour hand 363 is connected to center wheel 356 so that the time (time information) is displayed by these hands in conjunction with rotation of the rotor 313.

The drive circuit 18A is a circuit for supplying drive pulses of various waveforms to the stepping motor 310 according to drive commands from the watch CPU 14. This drive circuit 18A has a bridge circuit consisting of p-channel MOS transistor 333a, n-channel MOS transistor 332a, p-channel MOS transistor 333b, and n-channel MOS transistor 332b. The drive coil 311 of stepping motor 310 is inserted between the node between p-channel MOS transistor 333a and n-channel MOS transistor 332b, and the node between p-channel MOS transistor 333b and n-channel MOS transistor 332*b*. A drive pulse is supplied to drive coil 311 and the rotor 313 is thus driven by applying a control pulse from watch CPU 14 to the gate electrodes of these MOS transistors 332*a*, 332*b*, 333*a*, and 333*b*.

(Structure of an Electronic Watch)

Figure 5:
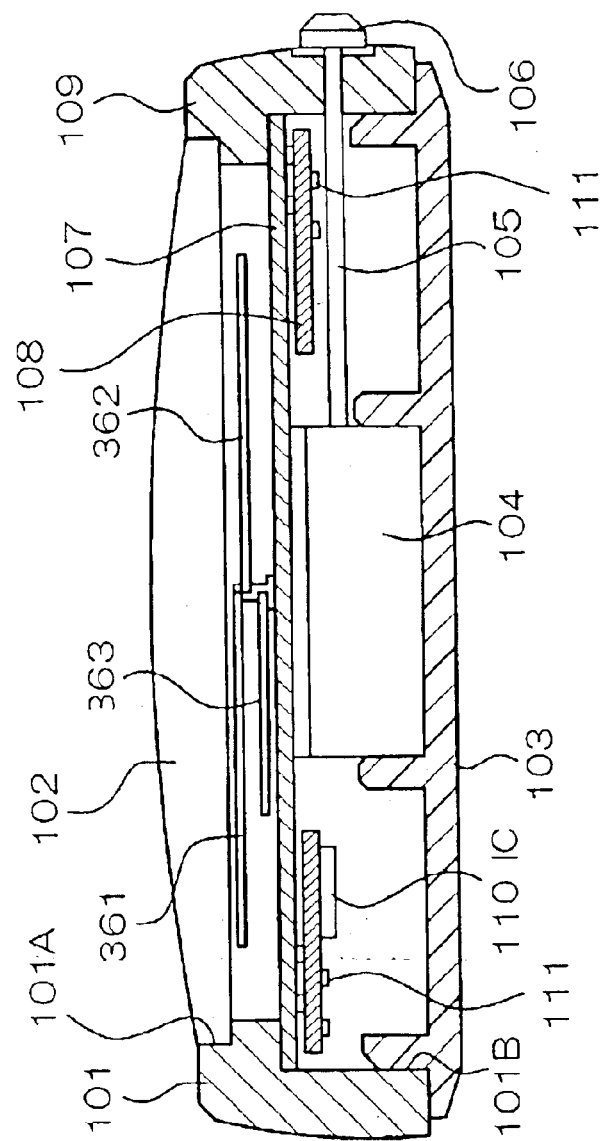
FIG. 5 is a longitudinal section view schematically showing the internal structure of an electronic watch 100 according to a first embodiment of the present invention.
Figure 6:
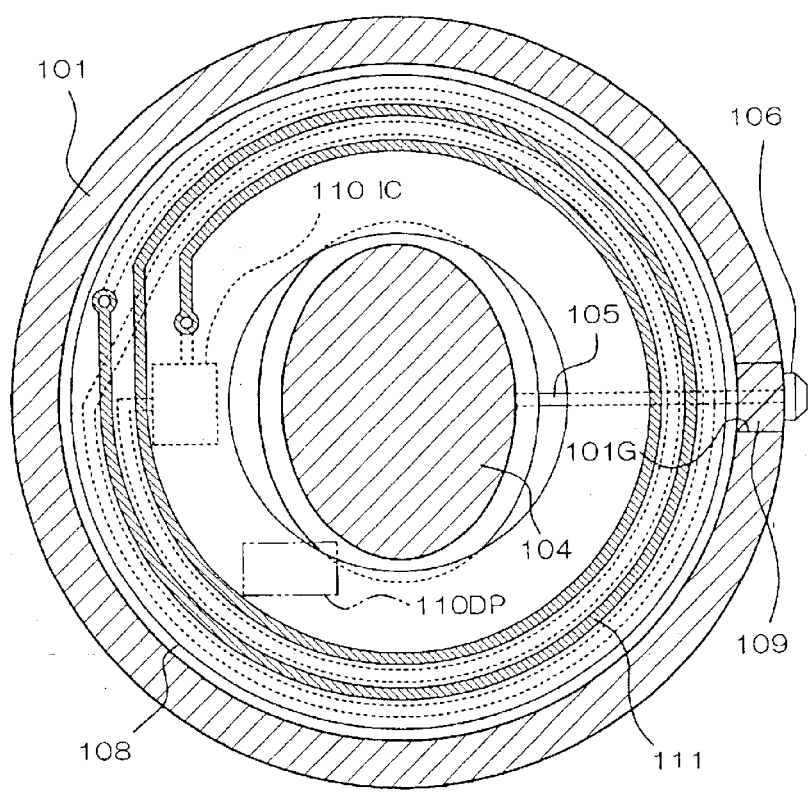
FIG. 6 is a horizontal section view schematically showing the internal structure of an electronic watch 100 according to a first embodiment of the present invention.

As shown in FIG. 5 and FIG. 6 an electronic watch 100 according to this embodiment of the invention has a case 101, a crystal 102 mounted in dial-side opening 101A of this case 101, a back cover 103 mounted in back-side opening 101B of case 101, a movement (time information display processor) 104 disposed inside the case 101, crown (external operating member) 106 mounted on the outside end of stem 105, dial 107 disposed inside the crystal 102, and annular substrate 108 fixed to the back side of dial 107. The crystal 102 is a see-through construction made from a material that is transparent and electrically insulating. Sapphire or polycarbonate, for example, can be used for this material. Eddy current generation can thus be prevented.

The watch CPU 14, drive circuit 18A, and drive mechanism 18B described above with reference to FIG. 4 are built in to the movement (time information display processor including a time measuring means) 104. A battery, high capacity capacitor, or other power source may be built in to the movement 104 as necessary. A display unit is also formed by the crystal 102, dial 107, and hands such as the second hand 361, minute hand 362, and hour hand 363.

Substrate 108 is a printed circuit board made of epoxy resin or phenol resin reinforced with glass fiber or glass cloth as necessary, or a flexible printed circuit board made from polyimide resin, for example. An antenna 111 with a loop shape is formed on both top and bottom sides of the substrate 108 (in the shown example the antenna winds two revolutions on both top and bottom sides). In the shown example the antenna 111 is formed from a conductive pattern of copper foil, for example, bonded to the substrate 108.

It will be further noted that while the antenna 111 is shown in the figure formed in a loop winding plural revolutions, the number of turns and shape of the loop antenna can be determined as desired. More specifically, if the frequency of the carrier wave is 13.56 [MHz], a loop antenna with 2 to 3 loops is sufficient, and if the frequency is 125 [kHz] several hundred turns are needed.

Because gain improves as the aperture area of the loop antenna increases, antenna 111 is preferably formed along the inside circumference part of the case 101 (adjacent to the inside circumference part). In this embodiment substrate 108 is formed as a circle along the inside surface of the case 101, and the loop of antenna 111 is formed on the outside circumference side on substrate 108. The movement 104 is disposed on the inside of the opening formed on the inside of the annular shape of substrate 108.

The above-noted communication module 110IC is mounted on the substrate 108 and is connected to both ends of antenna 111. It should be noted that the tuning capacitor 112 connected to antenna 111 is also mounted on substrate 108 but is not shown in this figure.

Figure 8:
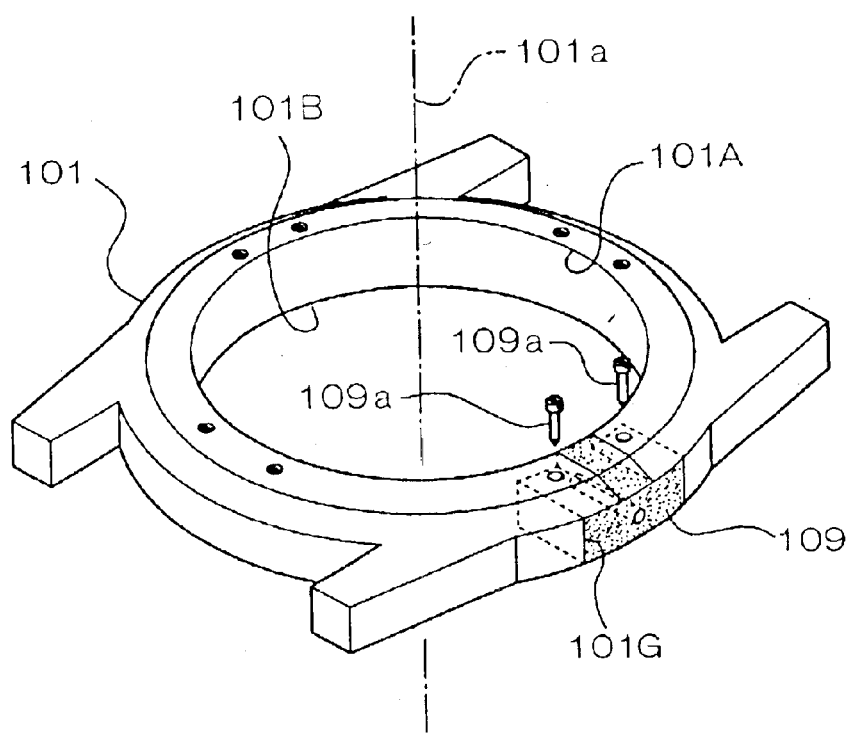
FIG. 8 is an oblique view schematically showing the appearance of the case of the electronic watch 100 according to the first embodiment of the present invention.
Figure 9:
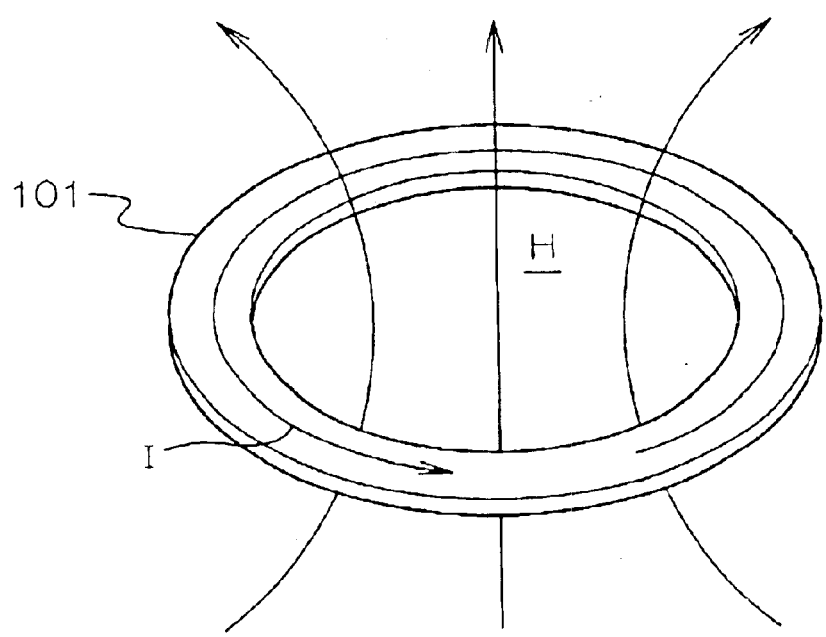
FIG. 9 is a descriptive diagram for explaining what happens when the case of a conventional electronic watch is placed in a fluctuating magnetic field.

As also shown schematically in FIG. 8, case 101 of this embodiment is made from a conductive member such as metal (stainless steel, brass, titanium, or other) formed substantially as a ring with dial-side opening 101A and back-side opening 101B. A gap 101G configured to completely interrupt the case at one part in the circumferential direction is further disposed to the case 101 as an insulating part for insulating the case in the circumferential direction as seen in the direction encircling the circumference of openings 101A and 101B. That is, the case 101 is C-shaped when seen in plan view due to gap 101G. Because the width (thickness) of gap 101G in the circumferential direction of case 101 only needs to be sufficient to prevent or reduce the occurrence of eddy current described below, it can be quite slight, less than 1 mm, and on the order of 0.1 mm to 1.0 mm, for example. We have confirmed that if a 13.56 [MHz] carrier wave is used a gap of 0.5 mm or more assures sufficient insulation and is thus preferable.

An insulation material 109 that is a non-conductive member made from a synthetic resin or other insulator is disposed inside this gap 101G. The insulation material 109 shown here is an inverted T-shape when seen from the side of case 101, and is fastened to the case 101 by mounting screws 109*a* when fit to the gap 101G. That is, insulation material 109 engages the case 101 in the axial direction (axial to the circumference) of the case 101. The insulation material 109 is positioned to the proper position when it is fit to the case 101. Furthermore, to improve the appearance of the exterior design, screws with a head design identical to the mounting screws 109*a* (or parts with an appearance identical to the screws) are placed at 90 degree intervals symmetrically to the mounting screws 109*a* around the face side of the case 101 (at the 12 o'clock, 6 o'clock, and 9 o'clock positions). It should be noted that the case 101 and insulation material 109 can be bonded to each other with adhesive, welding; or other method. More specifically, gap 101G is formed to the case 101 at the 3 o'clock position on the outside circumference, and a through-hole for passing the stem 105 is formed in the insulation material 109 disposed in this gap 101G.

Furthermore, to enable transmission of waves between this antenna 111 and the case exterior, the dial 107 disposed on one side in the axial direction of the case 101 and back cover 103 disposed on the other side (the side opposite dial 107) in the axial direction of the case 101 are made from an insulator of synthetic resin or ceramic, for example. Good communication conditions can thus be achieved because an electromagnetic field of radio waves is formed effectively in the aperture of the antenna 111.

It should be noted that if the communication content of the contactless data communication further described below is to be displayed, a display 110DP such as a liquid crystal display panel is preferably mounted on the substrate 108 as indicated by the double-dot dash line in FIG. 6 as a display means for presenting the communication content, and an opening for exposing the surface of this display 110DP is formed in dial 107. This enables viewing the communication content presented on the display surface of display 110DP exposed through the opening in dial 107.

(Operation of the Electronic Watch 100)

Figure 7:
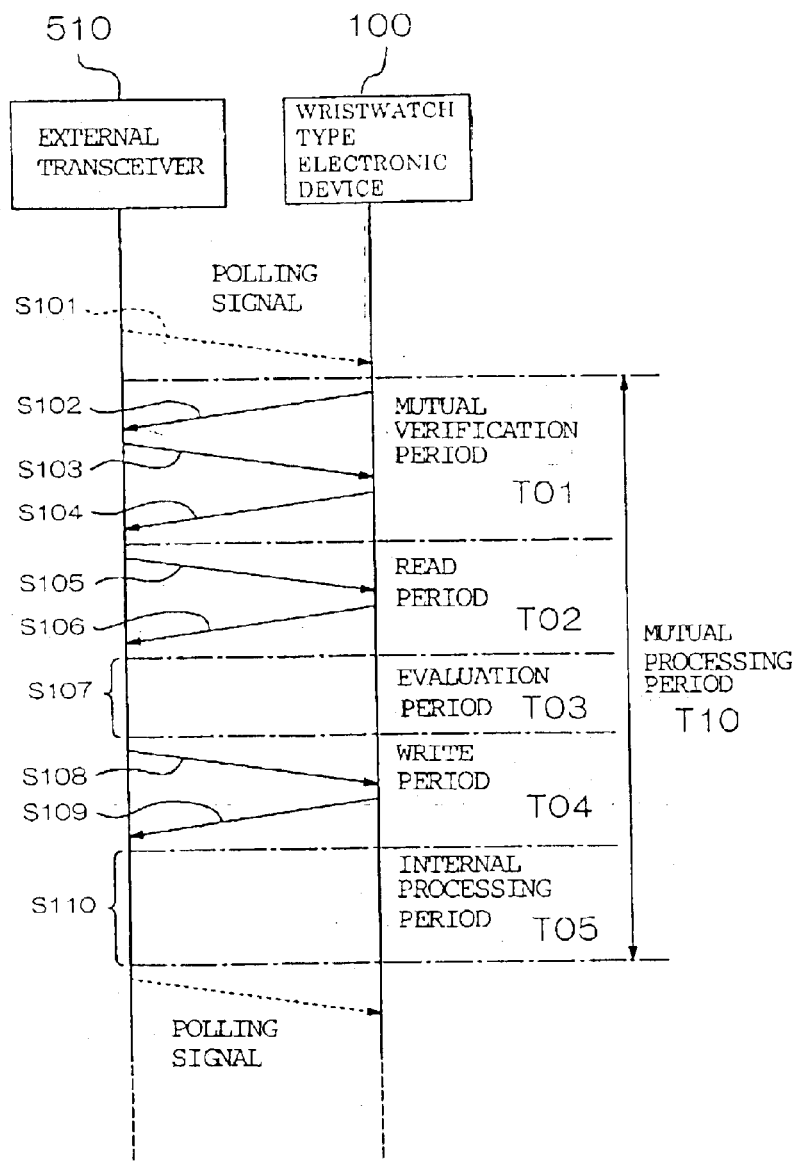
FIG. 7 is a sequence diagram showing the communication sequence of the communication system.

The operation of electronic watch 100 is described next. FIG. 7 is a sequence diagram showing the procedure for contactless data communication between electronic watch 100 and external transceiver 510.

As shown in FIG. 7, external transceiver 510 normally repeatedly outputs a polling signal (communication request) at a specific period, for example, using a start/stop tuning protocol (step S101). More specifically, control device 511 of external transceiver 510 causes the transmission circuit 512 to generate a polling signal and continues to send this polling signal through high frequency circuit 514 and antenna 515. When electronic watch 100 (wristwatch type electronic device) comes within communication range of external transceiver 510 and detects the polling signal, it starts communicating. To communicate it first sends data for mutual verification to the external transceiver 510 (step S102), and thus enters mutual verification period T01. The external transceiver 510 thus detects that electronic watch 100 entered its communication range and sends data for mutual verification to electronic watch 100 (step S103). When it receives this data electronic watch 100 sends response data indicating completion of mutual verification to the external transceiver 510 (step S104).

Read period T02 follows after mutual verification is thus completed, and external transceiver 510 sends read request data to read data from electronic watch 100 (step S105). The electronic watch 100 thus reads the corresponding data from a memory address in memory 110M (see FIG. 3) corresponding to the read request data, and sends it to external transceiver 510 (step S106).

Evaluation period T03 follows after the memory data from electronic watch 100 is thus received by external transceiver 510. In this evaluation period T03 external transceiver 510 recognizes the expiration date and data type, such as a boarding pass or prepaid card, from the received data, and determines if the content can be accepted or not (step S107).

The external transceiver 510 enters write period T04 when this evaluation is completed, and returns data indicating a detected boarding pass or payment amount to the electronic watch 100 (step S108). In response electronic watch 100 returns reply data indicating that this data was received to the external transceiver 510 (step S109).

When communication according to this procedure ends electronic watch 100 enters internal processing period T05. In this period T05 the data content sent in step S108 is written to a corresponding storage address in memory 110M to record (a boarding record) or update (remaining balance information) the necessary items. Also in this period T05 external transceiver 510 confirms the reply data sent from electronic watch 100 in step S109, and then prepares for the next polling process (step S110).

It should be noted that if display 110DP is disposed as indicated by the double-dot dash line in FIG. 6, for example, the communication status, communication process step, or communication process content (such as boarding pass recording or other recording step, or remaining balance or payment amount data) may be displayed on this display 110DP in the mutual verification period T01, read period T02, evaluation period T03, write period T04, and internal processing period T05. Furthermore, if as in the below-described second embodiment the liquid crystal display or other display is configured to also display time information, displaying the time information can be temporarily stopped in mutual processing period T10. In this case the above-noted communication status, communication process step, or communication process content, for example, could be displayed instead of the time information.

In the present embodiment described above a gap 101G that is an insulation part is disposed in part of the ring-shaped case 101, which is a conductor, as shown in FIG. 8. This prevents the eddy current (loop current) that occurs when the magnetic field fluctuates in the direction the magnetic flux extends along the annularly shaped axis 101$a$ of case 101 and suppresses a drop in the transmission strength and reception sensitivity of contactless data communication.

That is, because magnetic flux passing the opening in case 101 changes when ring-shaped case 101 is made from a conductor and does not have a gap such as described above, and field H fluctuates periodically in the neighborhood of case 101 due to external radio-waves or radio waves produced by antenna 111, eddy current (loop current) I results from electromagnetic induction. Because this eddy current I consumes energy in the radio waves, it reduces the reception sensitivity of the antenna 111 disposed inside case 101 and reduces the strength of radio waves transmitted from antenna 111. The effect of this eddy current I is particularly great when the axis 101$a$ of case 101 shown in FIG. 8 and the loop axis 111$a$ of antenna 111 shown in FIG. 3 are substantially parallel.

Figure 10:
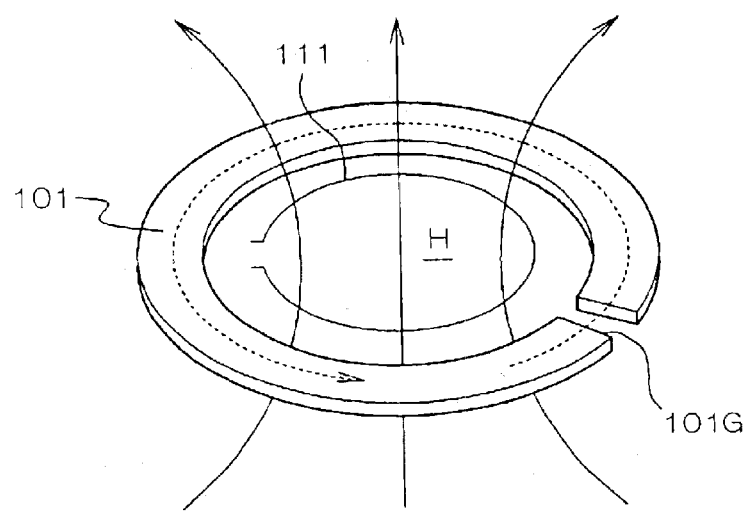
FIG. 10 is a descriptive diagram for explaining what happens when a case according to the present invention is placed in a fluctuating magnetic field.

However, this eddy current I does not occur in the case of the present embodiment because gap 101G, which is an insulator, is disposed to case 101 as shown in FIG. 10, radio wave energy loss is therefore also reduced, and a drop in transmission strength and reception sensitivity during communication can also be suppressed. Furthermore, because the annularly shaped axis of case 101 and the loop axis of antenna 111 are substantially aligned, or more specifically because the loop of antenna 111 is inside the annularly shaped case 101, case 101 acts as a shield for antenna 111, and thus functions as a shielded loop antenna known from the literature as taught, for example, in Japanese Patent Laid-Open Publication (kokai) S56-27509.

Moreover, when the frequency band used for contactless data communication in the present embodiment is in the range of approximately 40 [kHz] to 600 [MHz], it is possible to reduce the size of the electronic watch by configuring the antenna 111 as a loop antenna.

[Second Embodiment]

Figure 11:
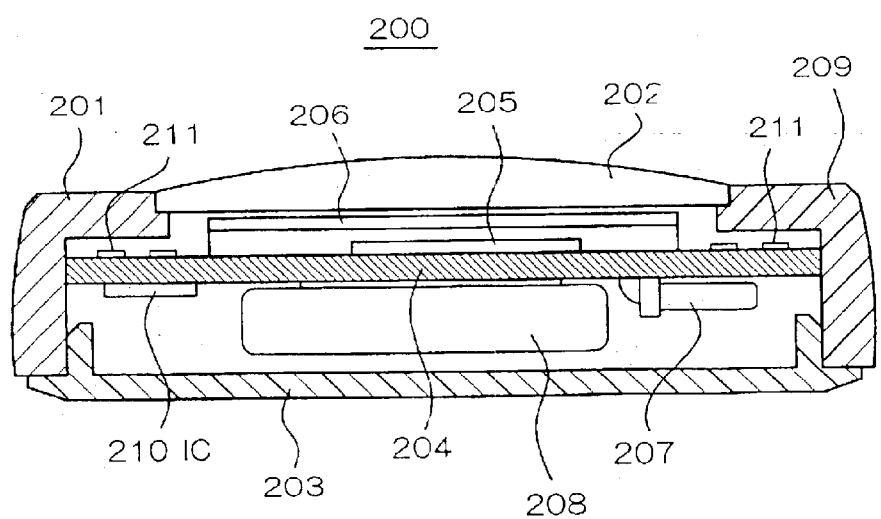
FIG. 11 is a longitudinal section view showing the internal structure of an electronic watch 200 according to a second preferred embodiment of the present invention.

An electronic watch 200 according to a second embodiment of the present invention is described next referring to FIG. 11. This embodiment is also configured for contactless data communication with an external transceiver 510 as shown in FIG. 1 and FIG. 2, and description of the configuration of external transceiver 510 is therefore omitted.

This electronic watch 200 has a case 201 made from a metal or other conductive material, crystal 202 mounted in a dial-side opening in case 201, back cover 203 made from an insulator mounted on the back-side opening in case 201, and a circuit board 204 disposed inside case 201. Mounted on this circuit board 204 are a clock IC 205, liquid crystal display panel or other display 206, quartz oscillator 207 for clock generation, and storage battery 208 such as a voltaic secondary cell or capacitor. In other words, this electronic watch 200 is a digital watch with a digital display 206.

A loop-shaped antenna 211 is formed on the surface of circuit board 204, and a communication module 210IC identical to that in the first embodiment is mounted on the back of circuit board 204.

This embodiment has part of the annular case 201 cut out with an insulator 209 made from a synthetic resin, for example, fixed in the resulting gap. Therefore, even if the case 201 is made from a conductive material, for the same reasons described in the above first embodiment, the effects on transmission and reception by the antenna 211 disposed inside the case 201 are reduced.

[Variation 1]

Figure 12:
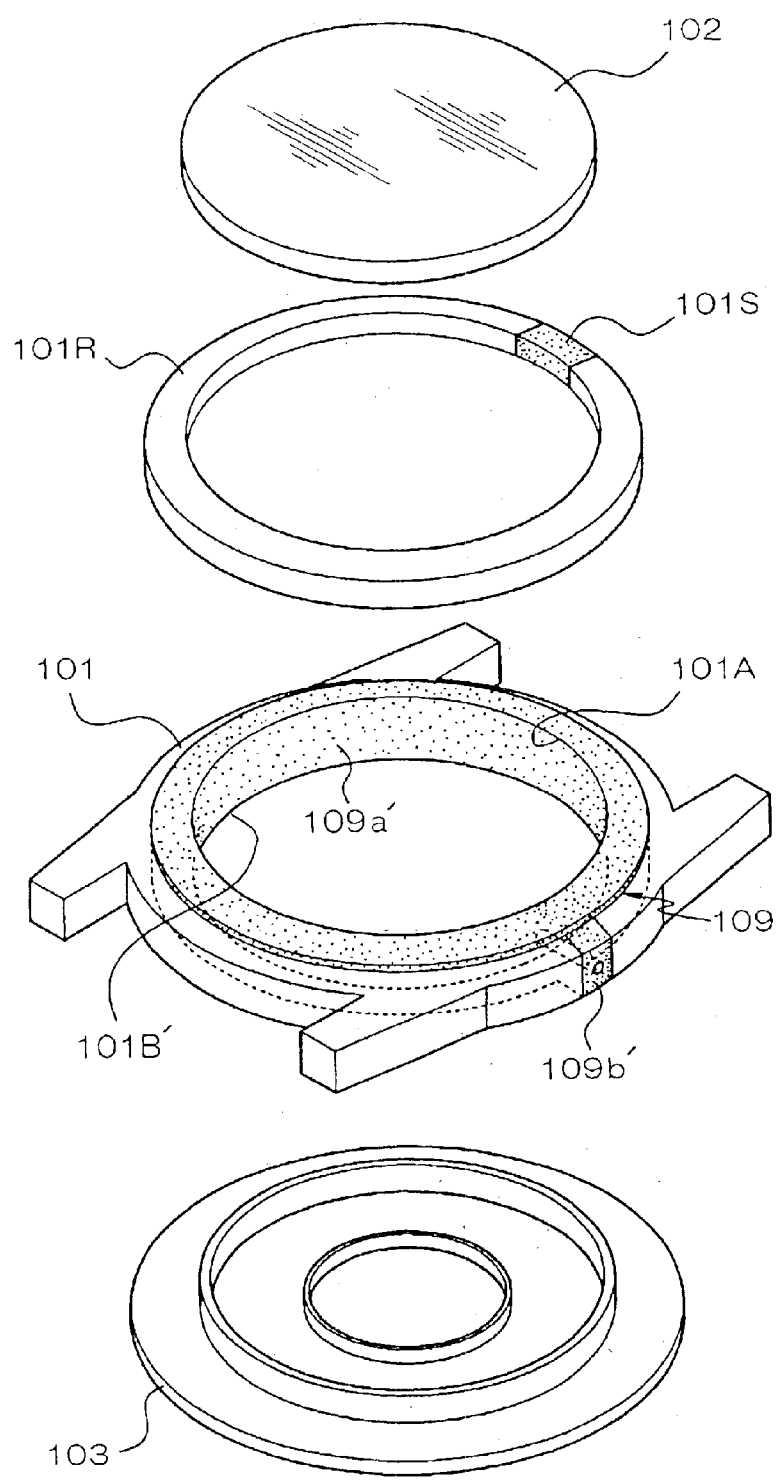
FIG. 12 is an exploded oblique view schematically showing the exterior structure of another embodiment (first variation) of the present invention.

A first variation of the preceding embodiments is described next with reference to FIG. 12. FIG. 12 is an exploded oblique view schematically showing the structure of the external members in a variation of the electronic watch 100 according to the first embodiment. It should be noted that parts other than those shown in the figure are identical to those in the first embodiment.

This first variation has an annular case 101' with a dial-side opening 101A' and back-side opening 101B', and a crystal 102 and back cover 103 as in the first embodiment. This embodiment is configured so that a bezel 101R can be mounted on the outside on the dial side of case 101'. This bezel 101R is made from a ring shaped conductive material such as a metal in a configuration having a part of the ring cut away and an insulation material 101S made from an insulator such as ceramic or shell placed and fixed inside the gap.

In this first variation the bezel 101R is made from a conductive material but because part of it is cut away and insulated occurrence of an eddy current in bezel 101R can be prevented and the effects of the antenna disposed inside case 101' on contactless data communication can be reduced. It is also possible to leave the gap in bezel 101R as a gap without disposing insulation material 101S therein.

Insulation material 109' is also disposed to the case 101', and insulation material 109' has an annular frame 109a' formed in a ring shape inside the case and an insulation fitting 109b' formed integrally with this annular frame 109a' and positioned inside the gap in case 101'. By thus disposing an annular frame 109a' configured in a ring inside case 101' to insulation material 109', the seal between case 101' and insulation material 109' can be improved and water resistance can be improved. Particularly because a bonding surface between the case and insulation material is not exposed inside the case as a result of configuring the annular frame 109a' so that it completely covers the inside surface of case 101', the seal, water resistance, and shock resistance can be further improved. It should be noted that in this case the case can be a one-piece configuration with an integrally formed bottom equivalent to the back cover. In this case the annular frame 109a' can be configured with a cover so as to completely cover the bottom inside surface of the one-piece case.

The insulation material 109' of this variation also engages the case 101' in the axial direction (circumferential axis) of the case 101'. Furthermore, because this insulation material 109' has an annular frame 109a' engaging the inside surface of the case 101', it is also engaged in the radial direction (radial to the circumference) of the case 101'. Therefore, when the insulation material 109' is fit to the case 101', the insulation material 109' is positioned in both the axial direction and radial direction to the case 101'.

It should be noted that an insulation member is disposed to the bezel mounted to the case in this example, but the same configuration can be applied to other outside member other than the bezel or inside member (such as the spacer) housed inside the case that is likewise made from an annular conductive material.

[Variation 2]

Figure 13:
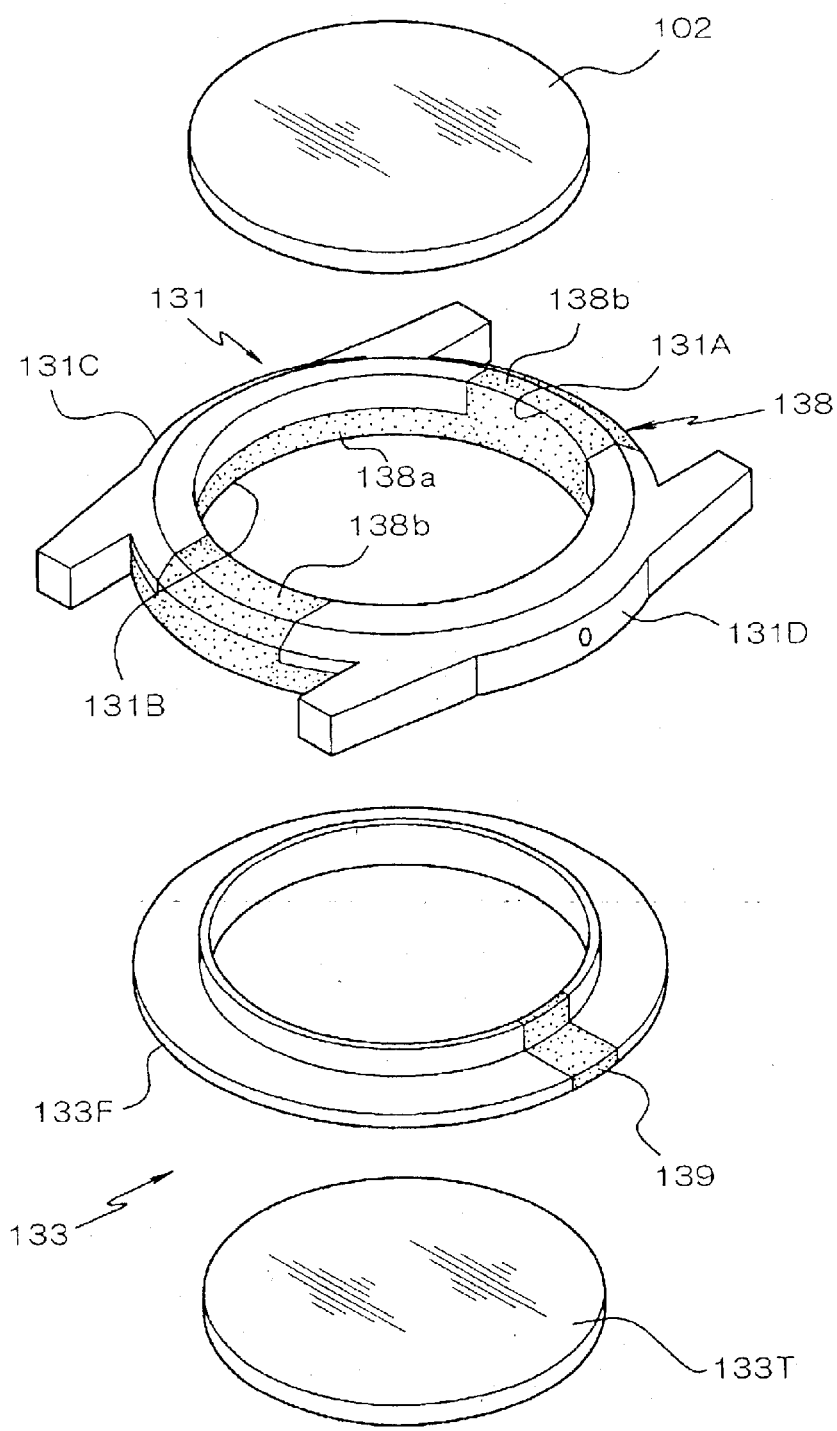
FIG. 13 is an exploded oblique view schematically showing the exterior structure of yet another embodiment (second variation) of the present invention.

A second variation of the above embodiments is described next referring to FIG. 13. In this variation gaps are formed at two locations in an annular case 131 having a dial-side opening 131A and a back-side opening 131B, and insulator fittings 138b of an insulation material 138 are disposed and fixed in these gaps. In the shown example an annular frame 138a is affixed to the back side of the case 131, and the insulator fittings 138b formed integrally to this annular frame 138a are disposed in the gaps of the case 131 between the lugs. Because the case 131 is thus configured from plural case parts 131C, 131D as a result of forming gaps at plural locations, parts processing is easier. It should be noted that the crystal 102 mounted to the dial-side opening 131A of this case 131 is the same as in the first embodiment.

In this second variation the back cover 133 has an annular cover frame part 133F made from metal or other conductive material, and a cap part 133T for closing the opening in this cover frame part 133F. A gap is disposed at one place in the circumferential direction of the cover frame part 133F, and an insulation material 139 made from synthetic resin or other insulator is fixably disposed in this gap. The cap part 133T is made from an insulator such as synthetic resin, glass, ceramic, or shell material. By making the cap part 133T from glass or other transparent material, a see-through construction enabling the inside of the case 131 to be seen can be achieved.

The cover frame part 133F of the back cover 133 in this second variation is made from a conductive material, but because the circumferential direction is insulated by the gap and the insulation material 139 disposed thereinside, the occurrence of eddy current can be prevented and its effects on contactless data communication can be reduced as described above.

Furthermore, because the insulation material 138 engages the case 131 in the axial direction (axial to the circumference) in this variation, fitting the insulation material 138 to the case 131 positions the insulation material 138 in the axial direction to the case 131.

[Variation 3]

Figure 14:
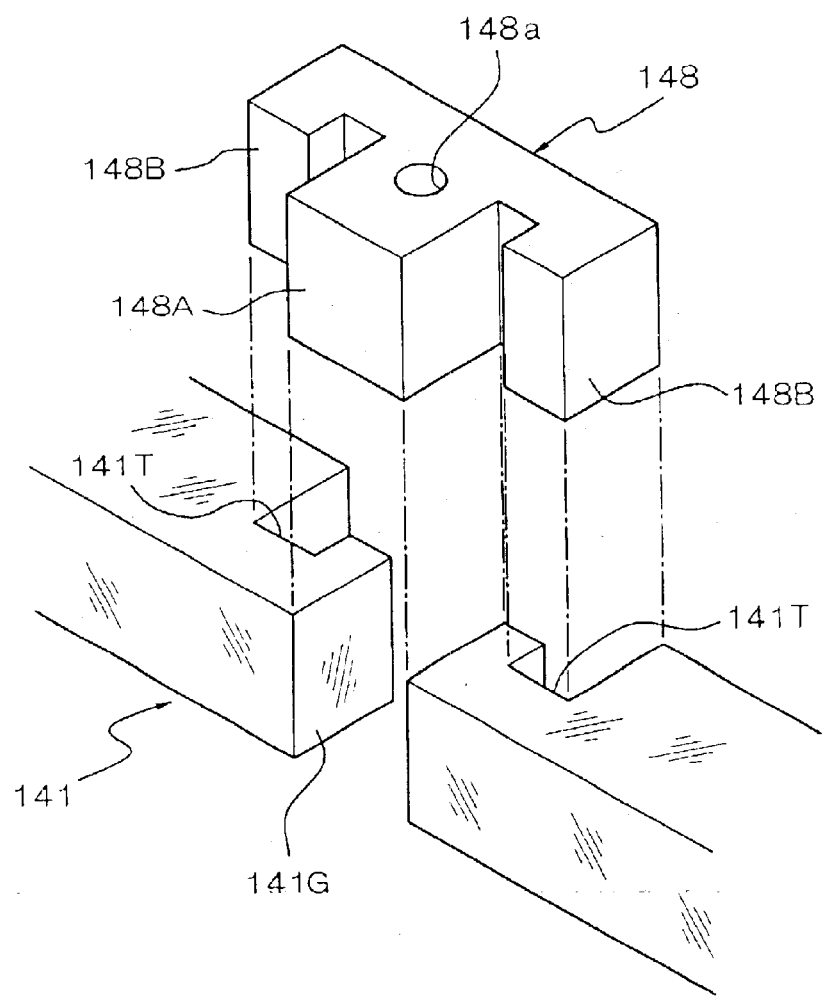
FIG. 14 is an exploded oblique view showing the fitting of a non-conductive member and a conductive member in another embodiment (third variation) of the present invention.

A further variation of the above embodiments is described next with reference to FIG. 14. FIG. 14 is an enlarged exploded oblique view showing the structure for fitting a non-conductive member to a conductive member in a third variation of the invention. A gap 141G is formed in the substantially annular conductive member 141 forming the case, for example. An engaging channel 141T is also formed in the conductive member 141 in a part proximal to the gap 141G.

A non-conductive member 148 made from synthetic resin or other insulator is fit in this gap 141G. An insulation part 148A fit into gap 141G and an engagement flange 148B fit into engaging channel 141T are disposed to this non-conductive member 148. In the example shown in the figure a through-hole 148a is formed in the non-conductive member 148. As in the preceding embodiments, this through-hole 148a is for passing a part such as the stem of the external operating member.

The conductive member 141 and non-conductive member 148 are engaged in the radial direction (radial to the circumference) of the conductive member 141 by this structure of fitting engaging channel 141T to engagement flange 148B. The non-conductive member 148 is thus positioned in the radial direction to the conductive member 141 by simply fitting it to conductive member 141.

Furthermore, because the non-conductive member 148 is engaged so as to connect the ends of the conductive member 141 overlooking the gap 141G, when the conductive member 141 and non-conductive member 148 are bonded with adhesive, for example, so that non-conductive member 148 acts to inhibit stresses causing the gap 141G of conductive member 141 to widen, it becomes difficult for stress to be applied to the bonded surfaces, and removal or separation of the non-conductive member 148 from the conductive member 141 can be prevented. Moreover, because conductive member 141 fully engages the non-conductive member 148 in the circumferential direction, the rigidity of the conductive member 141 can be increased.

The structure of this third variation for fitting the conductive member and non-conductive member together can be applied to all embodiments of the present invention and variations thereof.

[Third Embodiment]

Figure 15:
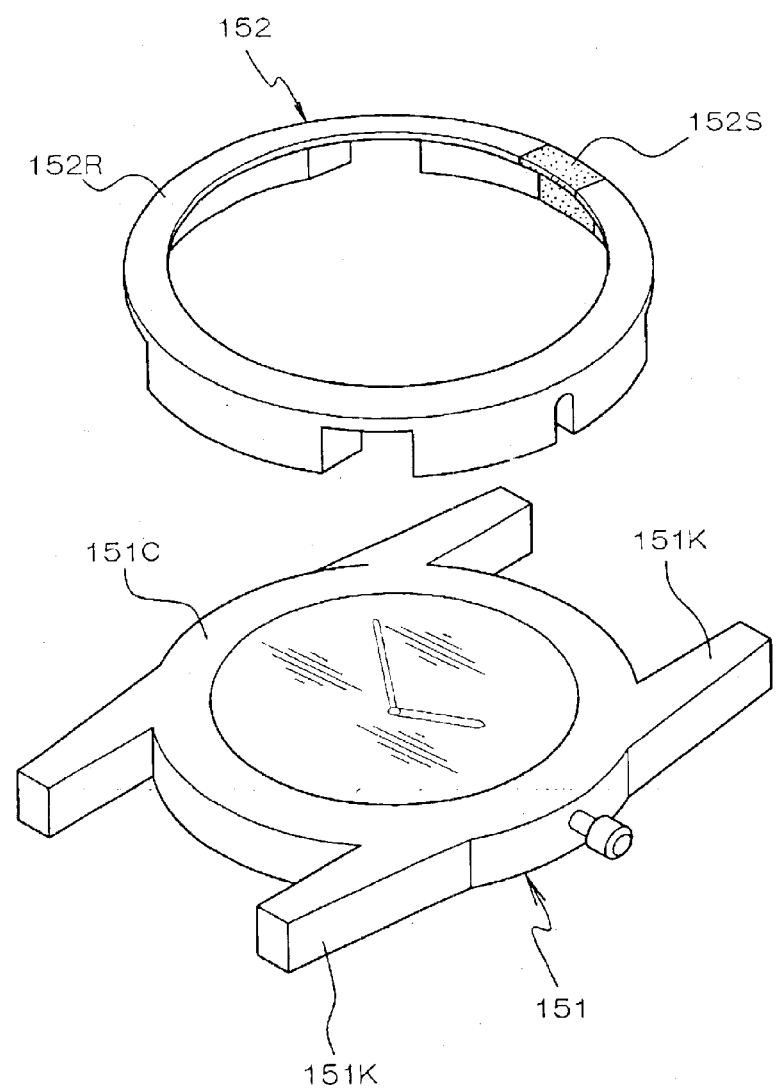
FIG. 15 is an exploded oblique view showing the case in a third embodiment of the present invention.

A third embodiment according to the present invention is described next with reference to FIG. 15. This embodiment forms an inside case 151 for housing the movement, for example, therein from a synthetic resin or other insulator. A housing part 151C and lugs 151K protruding from both sides of the housing part 151C for connecting a band not shown in the figures are disposed to this inside case 151.

An annular outside case 152 is fit to the outside surface of the above inside case 151, which is made from an insulator, so as to cover the housing part 151C. The outside case 152 is an annular frame with an L-shape in section. Multiple openings are disposed in the outside case 152 so that it does not contact the crown or other external operating members or the lugs 151K projecting to the outside from housing part 151C of inside case 151.

The outside case 152 has a ring part 152R that is a conductive member made from metal, for example. This ring part 152R is substantially annular with gaps provided in parts. A synthetic resin or other insulation material 152S is fit into these gaps.

By housing the movement including a time measuring means and contactless communication part inside an inside case 151 made from an insulator in this embodiment, electrical shorts and communication problems can be prevented, and greater freedom can be achieved in the exterior design by covering this inside case 151 with an outside case 152 made from a conductive material. For example, a sense of high quality can be improved by using a metal outside case 152.

[Fourth Embodiment]

Figure 16:
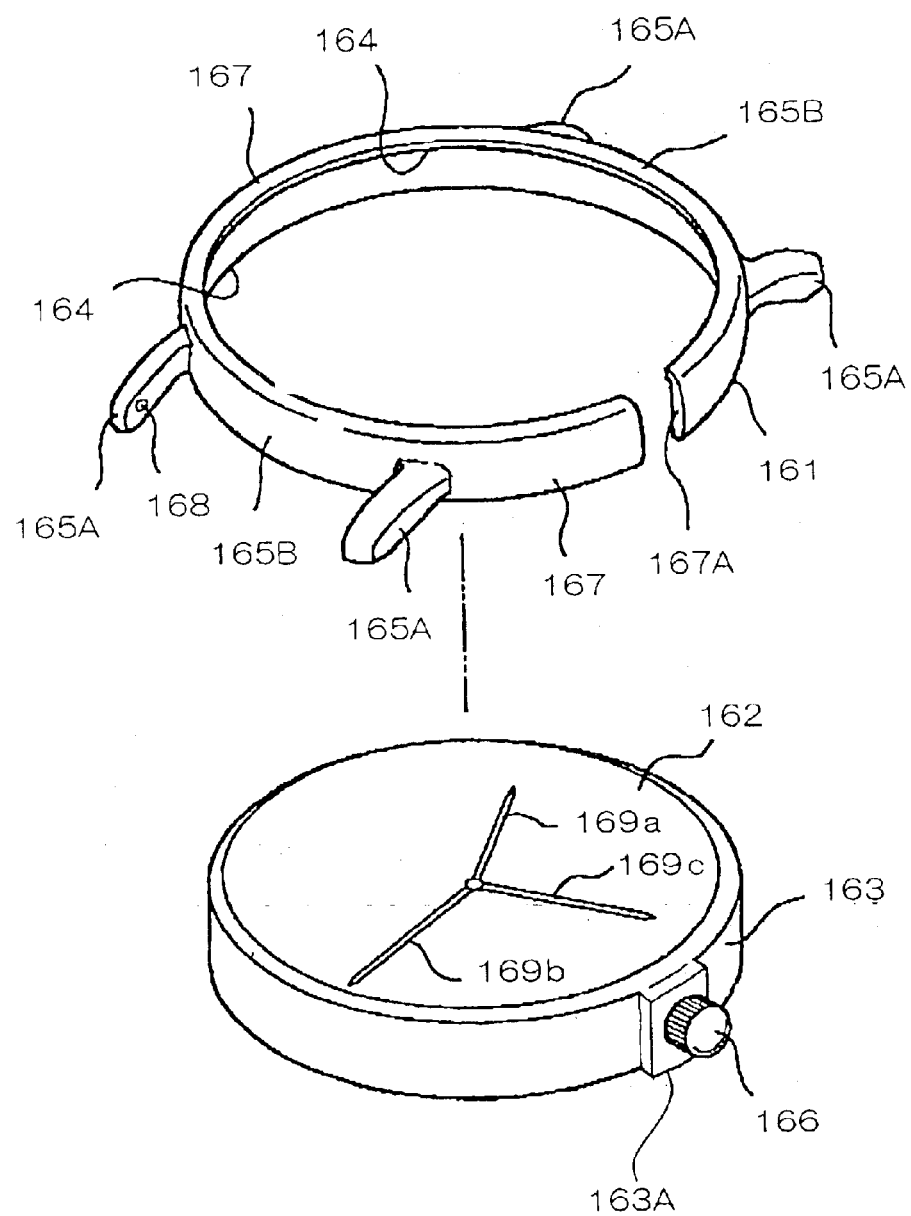
FIG. 16 is an exploded oblique view showing the case in a fourth embodiment of the present invention.

A fourth embodiment of the present invention is described next with reference to FIG. 16. An electronic watch according to this embodiment of the invention has a substantially annular frame 161 and an insulated case 163 made of synthetic resin inside of which is housed the watch movement (including a time information display processing part and contactless communication part). The electronic watch is assembled by fitting the insulated case 163 into the annular frame 161. The insulated case 163 and annular frame 161 are therefore disposed around the antenna of the contactless communication part.

The annular frame 161 has a pair of lug 165A that are projections made from a metal (stainless steel, brass, or titanium, for example) or other conductive member for attaching a band, inter-lug parts 165B (connecting parts) that are the connecting parts between the pairs of lugs 165A, and a main frame part 167 disposed contiguously to the inter-lug parts 165B in the circumferential direction of the annular frame 161.

One pair of lugs 165A and inter-lug part 165B are disposed at each end of the annular frame 161 (that is, at the 12 o'clock and 6 o'clock sides). A pivot hole 168 is formed to the mutually opposing inside surfaces of each pair of lugs 165A. These pivot holes 168 are for engaging the ends of metal or other spring pins (not shown in the figure), i.e., connecting members, and a strap (not shown in the figure) is attached to each pair of lugs 165A by these spring pins.

The main frame part 167 is formed between the above two inter-lug parts 165B. An insulation part 167A having a gap is formed in this main frame part 167. The main frame part 167 is thus interrupted in the circumferential direction by the gap in this insulation part 167A. The insulation part 167A in this embodiment is formed at the 3 o'clock position of the annular frame 161. It should be noted that the insulation part 167A can be formed by cutting after forming the annular frame 161 into a closed ring, or can be preformed in the annular frame 161.

The insulated case 163 is a hollow cylindrical shape (disk shape) having a bottom formed on the back side of the insulated case 163 and an opening on the face side of the insulated case 163. A crystal 162 made of glass or other non-conductive material is attached to the face side of the insulated case 163 so as to cover the opening. The bottom of the insulated case 163 and the crystal 162 are covers mounted in the opening 164 of the annular frame 161. The contactless communication part inside the insulated case 163 is enclosed by the annular frame 161 and these covers.

A crown (external operating member) 166 attached to the stem connected to the movement not shown in the figure protrudes from the side of insulated case 163. Hands 169a, 169b, 169c are disposed to the dial (not shown in the figure) attached to the top of the movement inside crystal 162. A protrusion 163A located inside the insulation part 167A of annular frame 161 is disposed to the side of insulated case 163. This protrusion 163A is formed where the crown 166 projects.

Because insulation part 167A is formed to the substantially annular frame 161 in this embodiment, the eddy current (loop current) that occurs when the magnetic field fluctuates in the direction the magnetic flux extends along the annularly shaped axis of frame 161 can be prevented and a drop in the transmission strength and reception sensitivity of contactless communication can be suppressed.

Furthermore, because it is not necessary to assure the strength, seal, or water resistance of the frame 161, which is a conductive member, if case strength, seal, or water resistance are assured in the insulated case 163, for example, by providing an insulated case 163 housing the movement, the insulation part 167A can be formed more easily and the freedom of design can be improved for the annular frame 161 with the present embodiment. The reliability of the electronic watch can also be increased by improving the case strength, seal, or water resistance.

[Fifth Embodiment]

Figure 17:
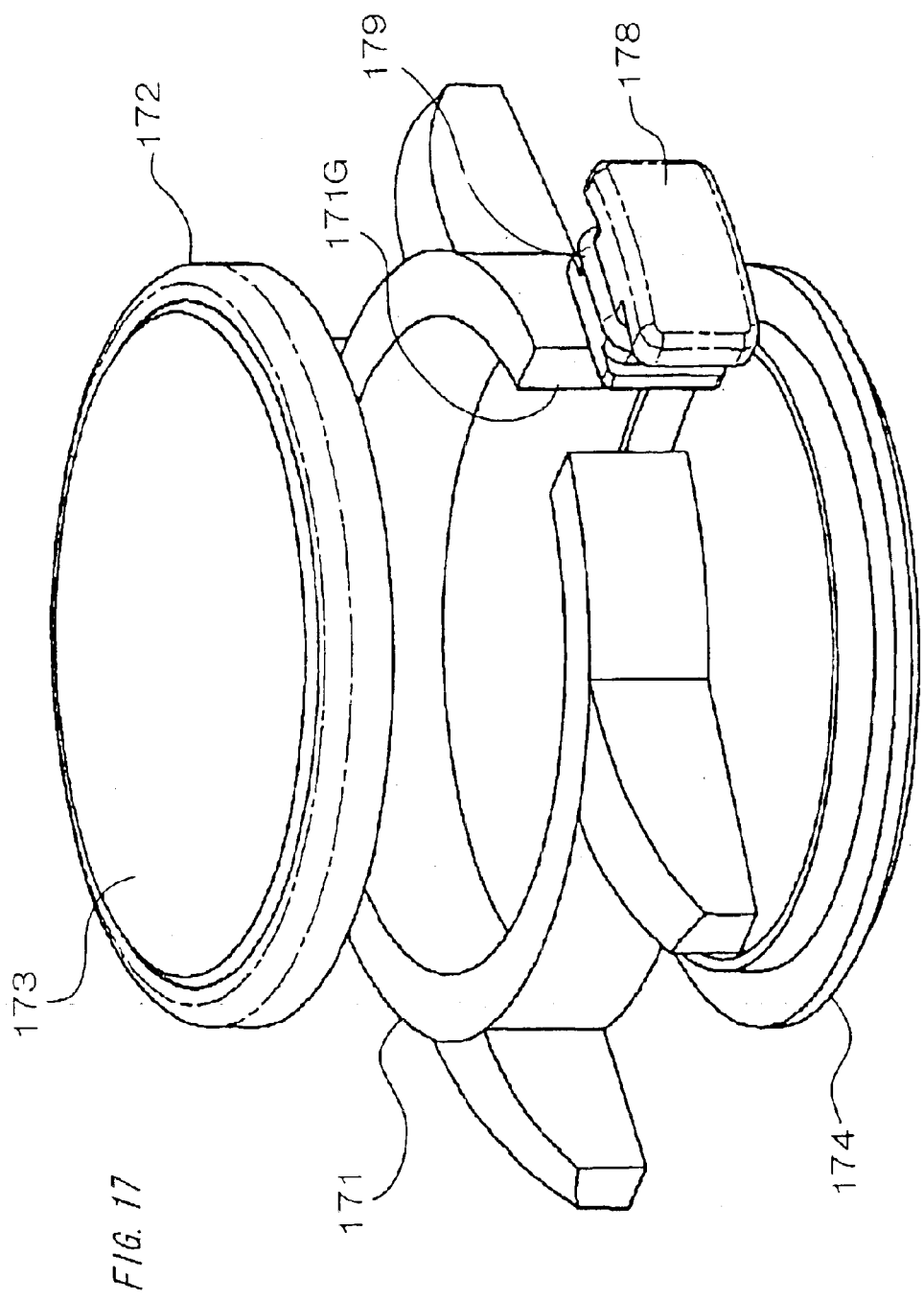
FIG. 17 is an exploded oblique view showing the case in a fifth embodiment of the present invention.

A fifth embodiment of the present invention is described next with reference to FIG. 17 to FIG. 19. A case 171 made from metal or other conductive material is provided in this embodiment as shown in FIG. 17. This case 171 is substantially annular with a in part.

A frame member 172 with a glass edge, for example, is attached to the front of case 171. This frame member 172 is made from synthetic resin or other insulator. A crystal 173 made of glass, for example, is mounted to the frame member 172. The case 171 and frame member 172 are connected by an appropriate method such as press fitting, adhesion, set screws, or screwing.

A back cover 174 is mounted to the back side of case 171. The back cover 174 is preferably made completely from an insulation material.

In this embodiment a fitting member 178 that is a non-conductive member made from synthetic resin or other insulator is fit into the gap 171G in case 171 with packing 179 made from synthetic rubber or other insulator mounted to the fitting member 178. In the example shown in the figure the fitting member 178 is fit into gap 171G from either the top or bottom of the case 171, and the frame member 172 and back cover 174 are then attached to the case 171 to form the outside case of the wristwatch.

Figure 18:
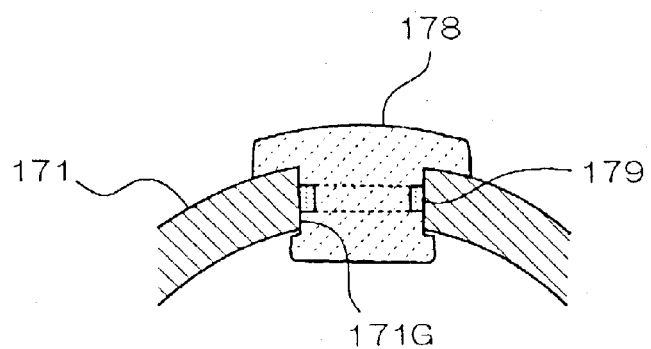
FIG. 18 is a partial side section view of the case in a fifth embodiment of the present invention.
Figure 19:
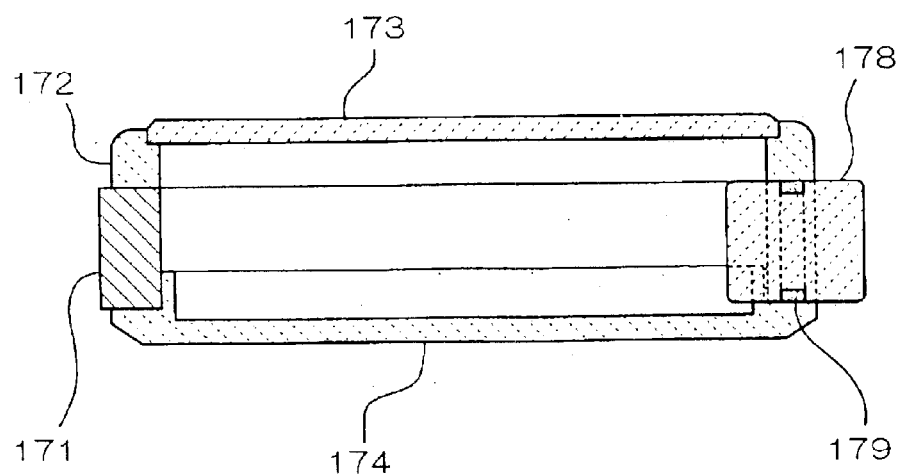
FIG. 19 is a longitudinal section view of the case in a fifth embodiment of the present invention.

A horizontal section view near the insulator part of the above case structure is shown in FIG. 18, and a longitudinal section view of the above case structure is shown in FIG. 19. As shown in these figures fitting member 178 is sealed with case 171, frame member 172, and back cover 174 by means of packing 179, thereby assuring water resistance.

It should be noted that a through-hole passing inside to outside through fitting member 178 can be disposed so that the stem and other external operating members can pass through.

[Variation 4]

Figure 20:
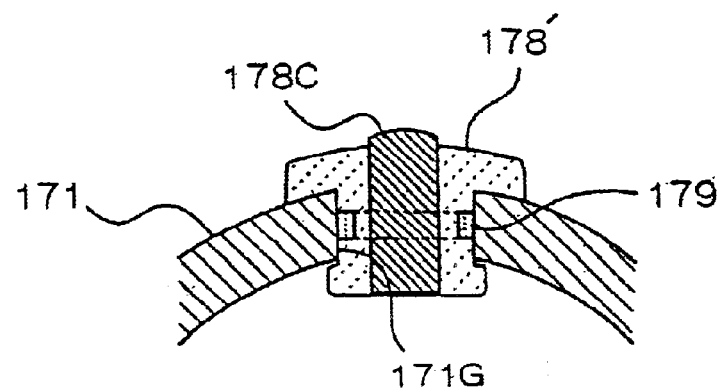
FIG. 20 is a partial side section view of the case in a preferred embodiment (fourth variation) modifying a part of the fifth embodiment of the invention.
Figure 21:
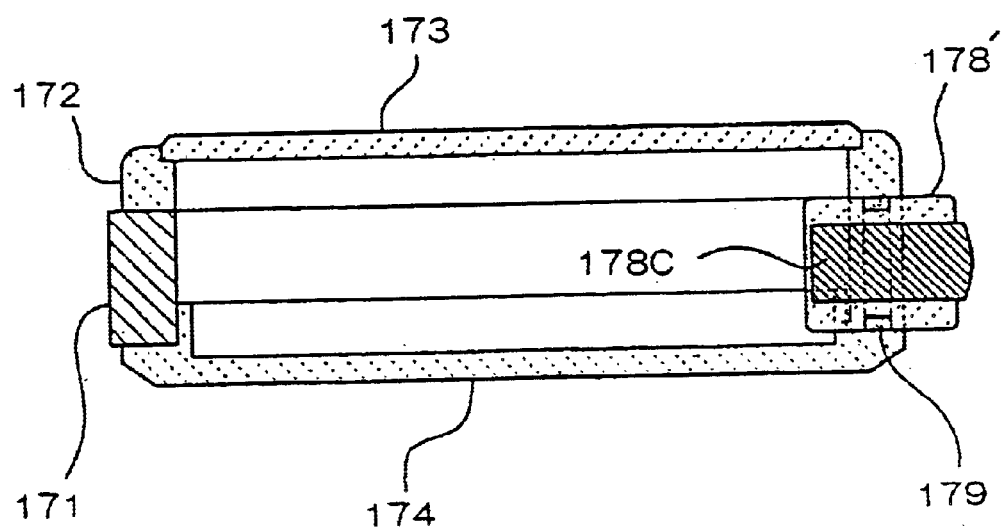
FIG. 21 is a longitudinal section view showing the case in the same embodiment (fourth variation).

A fourth variation modifying a part of the configuration of the fifth embodiment is shown in FIG. 20 and FIG. 21. As shown in FIG. 21 this variation has an outside case consisting of the same case 171, frame member 172, crystal 173, and back cover 174 as in the fifth embodiment. However, in this variation, as also shown in FIG. 20, fitting member 178' is fit and fixed inside gap 171G in case 171. This fitting member 178' has a metal core 178C located inside an insulator having the same external shape as the fitting member 178 of the fifth embodiment. This fitting member 178' with metal core 178C can be manufactured by insertion molding or other integrated molding process, or metal core 178C can be pressed into a hole opened in the insulator.

The same packing 179 as in the fifth embodiment is mounted to this fitting member 178'. The fitting member 178' is fit to case 171, frame member 172, and back cover 174 through packing 179.

The rigidity of the fitting member 178' can be improved in this embodiment because of the metal core 178C disposed inside the fitting member 178'.

It should be noted that a through-hole can be formed inside the metal core 178C to provide a structure enabling the operating shaft of an external operating member to be passed therethrough.

[Sixth Embodiment]

A sixth embodiment of the present invention is described next with reference to FIG. 22 and FIG. 23. This embodiment has, as shown in FIG. 23, a case 181, crystal 182, back cover 184, movement 185, and external operating member (crown) 186. The case 181 is an insulation member. In this embodiment the movement 185 housed inside the case 181 is positioned by an internal spacer 187 disposed inside case 181. The internal spacer 187 is made from metal or other conductive material.

The internal spacer 187 positions the movement 185 in the planar direction and axial direction by means of support flange 187a. The internal spacer 187 is also configured to act as a magnetic shield (antimagnetic ring) reducing unnecessary magnetic fields applied to the movement 185.

Figure 22:
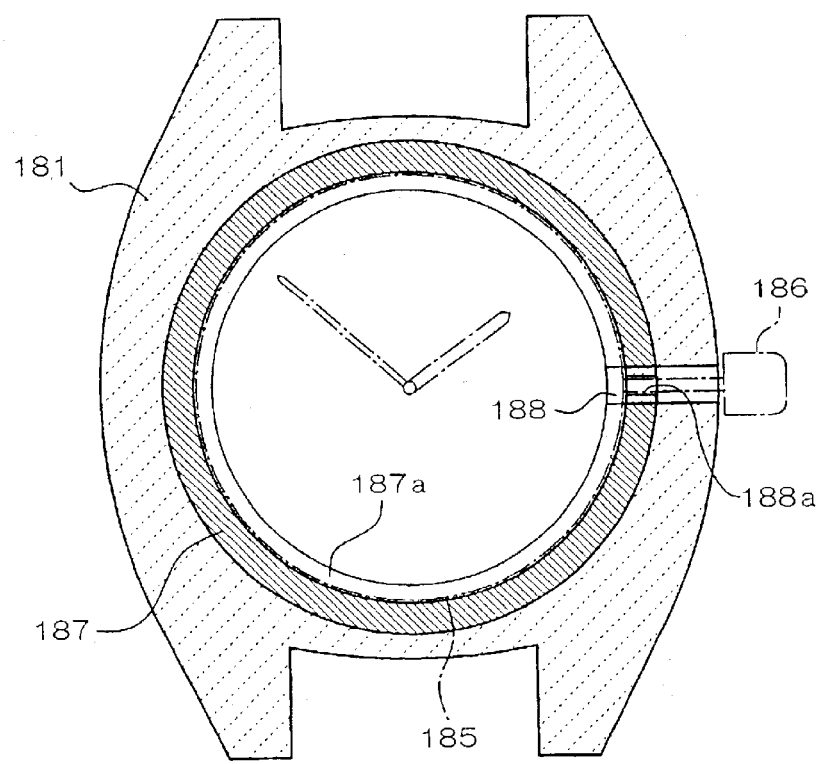
FIG. 22 is a horizontal section view of the case in a sixth embodiment of the present invention.
Figure 23:
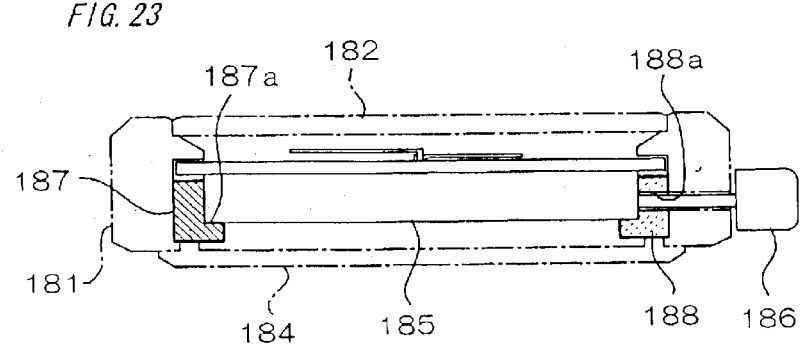
FIG. 23 is a longitudinal section view showing the case in the sixth embodiment of the invention.

The internal spacer 187 is overall annularly shaped as shown in FIG. 22 with a gap formed in one part. An insulator 188 that is a non-conductive member made from synthetic resin or other insulation material is fit inside this gap. As shown in the figure a through-hole 188a passing through in the radial direction of the case 171 is formed in insulator 188. An operating shaft connecting external operating member 186 and movement 185 passes through this through-hole 188a.

Because the internal spacer 187 of this embodiment is a conductive member a gap is formed in the internal spacer 187 so that eddy current does not occur, and insulator 188 is fit into this gap.

It should be noted that the internal spacer 187 in this embodiment has both a movement positioning function and a function as a magnetic shield, but could be configured as a member with only either one of these functions.

[Seventh Embodiment]

Figure 24:
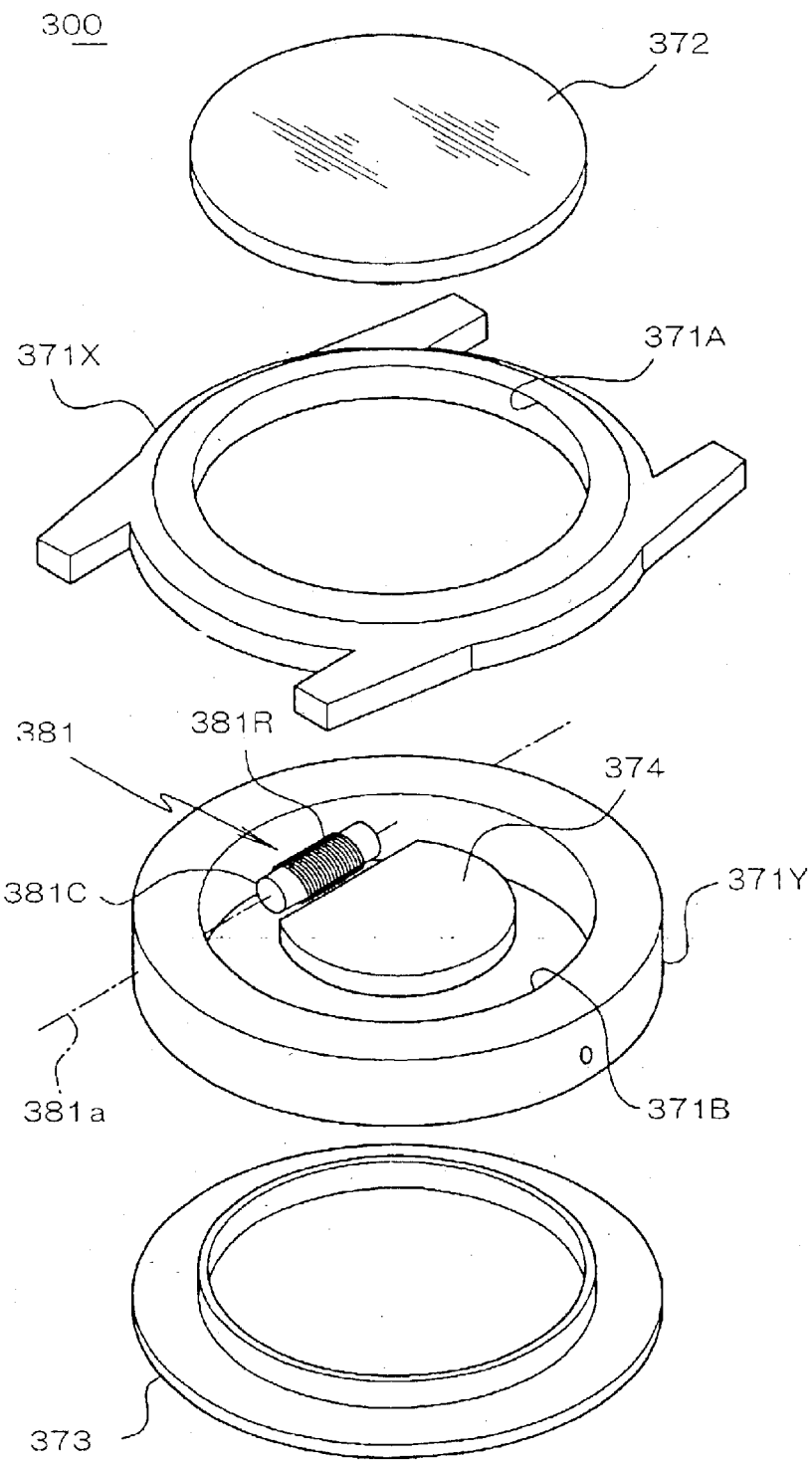
FIG. 24 is an exploded oblique view showing the basic structure of an electronic watch 300 according to a seventh embodiment of the present invention.

An electronic watch 300 according to the present invention is described last with reference to FIG. 24. This embodiment differs from each of the above embodiments in that the case consists of a metal or other conductive case part 371X and a synthetic resin or other insulating case part 371Y. Crystal 372 is attached to the dial-side opening 371A of case part 371X, and parts such as movement 374 and antenna 381 are housed inside the housing part 371B of case part 371Y. The stem, internal spacer, circuit board, and other parts are omitted in the figure. Back cover 373 is attached to the back of case part 371Y. The back cover 373 could be an insulator or a conductor.

The antenna 381 has a core 381C made of ferrite or other magnetic body, and a coil 381R wound to this core 381C. The loop axis 381a of this antenna 381 is oriented substantially orthogonally to the axis of the display face, opening 371A, and housing part 371B, and is disposed sideways to this axis. The open ends of this antenna 381 face the walls of the case part 371Y, which is an insulator. This configuration therefore does not have a conductor that would create interference at the open ends of the antenna 381. Because this antenna 381 has numerous turns, it is suitable for communication using a relatively low carrier frequency, such as 125 [kHz].

Because metal or other conductive material can be used for the case part 371X and back cover 373 in this embodiment, exterior design freedom is improved and case strength can be increased.

Furthermore, between the back cover 373 and the dial-side case part 371X is insulated by disposing an insulating case part 371Y between the conductive case part 371X and back cover 373 (that is, in the gap therebetween) in this embodiment, and a closed conductive path is not formed around the loop axis 381a of antenna 381 in at least the case. An eddy current therefore cannot arise in the case during contactless data communication, and a drop in communication sensitivity and transmission strength can be suppressed.

It should be noted that an electronic watch having a contactless data communication function according to the present invention shall not be limited to the above examples shown in the figures, and can obviously be varied in many ways without departing from the intended scope of the present invention. For example, in each of the above embodiments and variations the case, bezel, and cover frame part described as annular conductive members are round in shape, but this annular shape shall not be limited to round and could be rectangular or other suitable plane figure that overall describes a substantially circumferential shape. Furthermore, in each of the above embodiments the conductive members are made from a conductive material such as metal, but a ceramic or plastic member with the surface thereof metallized by a dry film plating process, for example, could be used instead of these conductive members.

Field of Application in Industry

With the present invention as described above a metal or other conductive member can be used-in an electronic watch having a contactless data communication function while maintaining communication quality and achieving a sense of high quality without sacrificing the performance required for a normal watch. In particular, by improving case strength or improving the water resistance or seal of the case, the reliability of an electronic watch having a contactless data communication function can be improved.

What is claimed is:

1. An electronic timepiece with a contactless data communication function comprising:

a contactless communication unit for contactless data communication with an external transceiver device:

a conductive member formed effectively into a semi-ring;

an insulative member attached along the circumferential direction of said conductive member to complete a ring shape with said conductive member;

a time measuring means; and a time information display unit; wherein the contactless communication unit includes an antenna for producing a magnetic field in the circumferential axis direction of the conductive member, and a transceiver means for contactless data communication via the antenna;

the conductive member is part of a case housing the time measuring means; and the insulative member constitutes a conductive gap electrically isolating ends of the conductive member in the circumferential direction thereof, and includes a non-conductive member disposed inside this gap.

2. An electronic timepiece with a contactless data communication function as described in claim 1, wherein the non-conductive member engages the conductive member in the circumferential axis direction or circumferential radius direction of the conductive member.

3. An electronic timepiece with a contactless data communication function as described in claim 1, further having an insulating-inside-case for housing the contactless communication unit, wherein the conductive member is mounted on an outside surface of the insulating-inside-case.

4. An electronic timepiece with a contactless data communication function as described in claim 3, wherein the conductive member is positioned around the time information display unit.

5. An electronic timepiece with a contactless data communication function as described in claim 1, wherein the antenna is a loop antenna.

6. An electronic timepiece with a contactless data communication function as described in claim 5, wherein the direction of the circumferential axis of the conductive member and the direction of the loop axis of the loop antenna are substantially in parallel.

7. An electronic timepiece with a contactless data communication function as described in claim 1, wherein the case is substantially annular, the time information display unit is located on one side of the axial direction of the case, and at least partly formed from an insulator.

8. An electronic timepiece with a contactless data communication function as described in claim 7, further having a closing member of which at least part is an insulator on another side of the case axis.

9. An electronic timepiece with a contactless data communication function as described in claim 8, wherein the closing member includes an annular conductive cover frame part opened in the axial direction, and an insulating cover part mounted so as to close the opening of the cover frame part.

10. An electronic timepiece with a contactless data communication function as described in claim 9, further having an insulation section for assuring electrical insulation in the circumferential direction, said insulation section being attached to at least part of the cover frame part in the direction encircling the perimeter of the opening.

11. A contactless data communication system having an electronic timepiece with a contactless data communication function as described in claim 1, and having an external transceiver device for contactless data communication with the electronic timepiece.

12. An electronic timepiece with a contactless data communication function comprising:

a contactless communication unit for contactless data communication with an external transceiver device;

a conductive member formed effectively into a semi-ring;

an insulative member attached along the circumferential direction of said conductive member to complete a ring shape with said conductive member;

a time measuring means;

a time information display unit; and an insulated case for storing the contactless communication unit and time measuring means; wherein the contactless communication unit includes an antenna for producing a magnetic field in the circumferential axis direction of the conductive member, and a transceiver means for contactless data communication via the antenna: and the conductive member is mounted so as to cover the insulated case.

13. The electronic timepiece of claim 12, wherein the conductive member is disposed around the time information display unit.

14. The electronic timepiece of claim 12, wherein the antenna is a loop antenna.

15. The electronic timepiece of claim 14, wherein the direction of the circumferential axis of the conductive member and the direction of the loop axis of the loop antenna are substantially parallel.

16. A contactless data communication system having an electronic timepiece as described in claim 12, and having an external transceiver device for contactless data communication with the electronic timepiece.

* * * * *